US008775243B2

(12) United States Patent
Gillenson et al.

(10) Patent No.: US 8,775,243 B2
(45) Date of Patent: *Jul. 8, 2014

(54) ELECTRONIC COUPON CREATION DEPLOYMENT, TRANSFERENCE, VALIDATION MANAGEMENT, CLEARANCE, REDEMPTION AND REPORTING SYSTEM AND INTERACTIVE PARTICIPATION OF INDIVIDUALS AND GROUPS WITHIN THE SYSTEM

(75) Inventors: Amy Gillenson, New York, NY (US); James Daniel Fornari, New York, NY (US)

(73) Assignee: Transactis, Inc., New York, NY (US)

( * ) Notice: Subject to any disclaimer, the term of this patent is extended or adjusted under 35 U.S.C. 154(b) by 721 days.

This patent is subject to a terminal disclaimer.

(21) Appl. No.: 12/661,484

(22) Filed: Mar. 19, 2010

(65) Prior Publication Data

US 2011/0029363 A1 Feb. 3, 2011

Related U.S. Application Data

(60) Provisional application No. 61/164,793, filed on Mar. 30, 2009.

(51) Int. Cl.
*G06Q 30/00* (2012.01)
*G06Q 30/02* (2012.01)

(52) U.S. Cl.
CPC ............ *G06Q 30/02* (2013.01); *G06Q 30/0233* (2013.01); *G06Q 30/0216* (2013.01); *G06Q 30/0213* (2013.01); *G06Q 30/0222* (2013.01); *G06Q 30/0211* (2013.01); *G06Q 30/0236* (2013.01); *G06Q 30/0224* (2013.01); *G06Q 30/0223* (2013.01); *G06Q 30/0231* (2013.01)

USPC .................... 705/14.15; 705/14.1; 705/14.17; 705/14.36; 705/14.38

(58) Field of Classification Search
USPC ........................................................ 705/14
See application file for complete search history.

(56) References Cited

U.S. PATENT DOCUMENTS

| | | | |
|---|---|---|---|
| 6,243,688 B1* | 6/2001 | Kalina ...................... 705/14.18 |
| 7,006,983 B1* | 2/2006 | Packes et al. .............. 705/14.34 |
| 7,784,683 B1* | 8/2010 | Segura .......................... 235/380 |
| 2002/0143626 A1* | 10/2002 | Voltmer et al. ................. 705/14 |
| 2005/0171955 A1* | 8/2005 | Hull et al. ....................... 707/10 |
| 2006/0190332 A1* | 8/2006 | Grider ............................ 705/14 |
| 2007/0060173 A1* | 3/2007 | Ramer et al. ............... 455/456.3 |
| 2008/0040475 A1* | 2/2008 | Bosworth et al. ............ 709/224 |
| 2008/0097851 A1* | 4/2008 | Bemmel et al. ................ 705/14 |
| 2008/0217397 A1* | 9/2008 | Degliantoni et al. ......... 235/380 |
| 2009/0070228 A1* | 3/2009 | Ronen ............................ 705/26 |

* cited by examiner

*Primary Examiner* — John G Weiss
*Assistant Examiner* — Vincent Cao
(74) *Attorney, Agent, or Firm* — James D. Fornari

(57) ABSTRACT

This invention relates generally to electronic commerce (e-commerce) systems and media platforms, for use with both mobile and non-mobile systems, to deploy virtual advertising and promotion via the use of electronic coupons, and more particularly a method and system for creating, deploying, transferring, clearing, managing, redeeming and reporting on the use of electronic coupons or virtual electronic rebates (VeeBates) and permitting individuals and groups within one or more social communications networks to participate in and transmit information to others about their activities related to the virtual advertising, incentives, redemption and promotion.

46 Claims, 16 Drawing Sheets

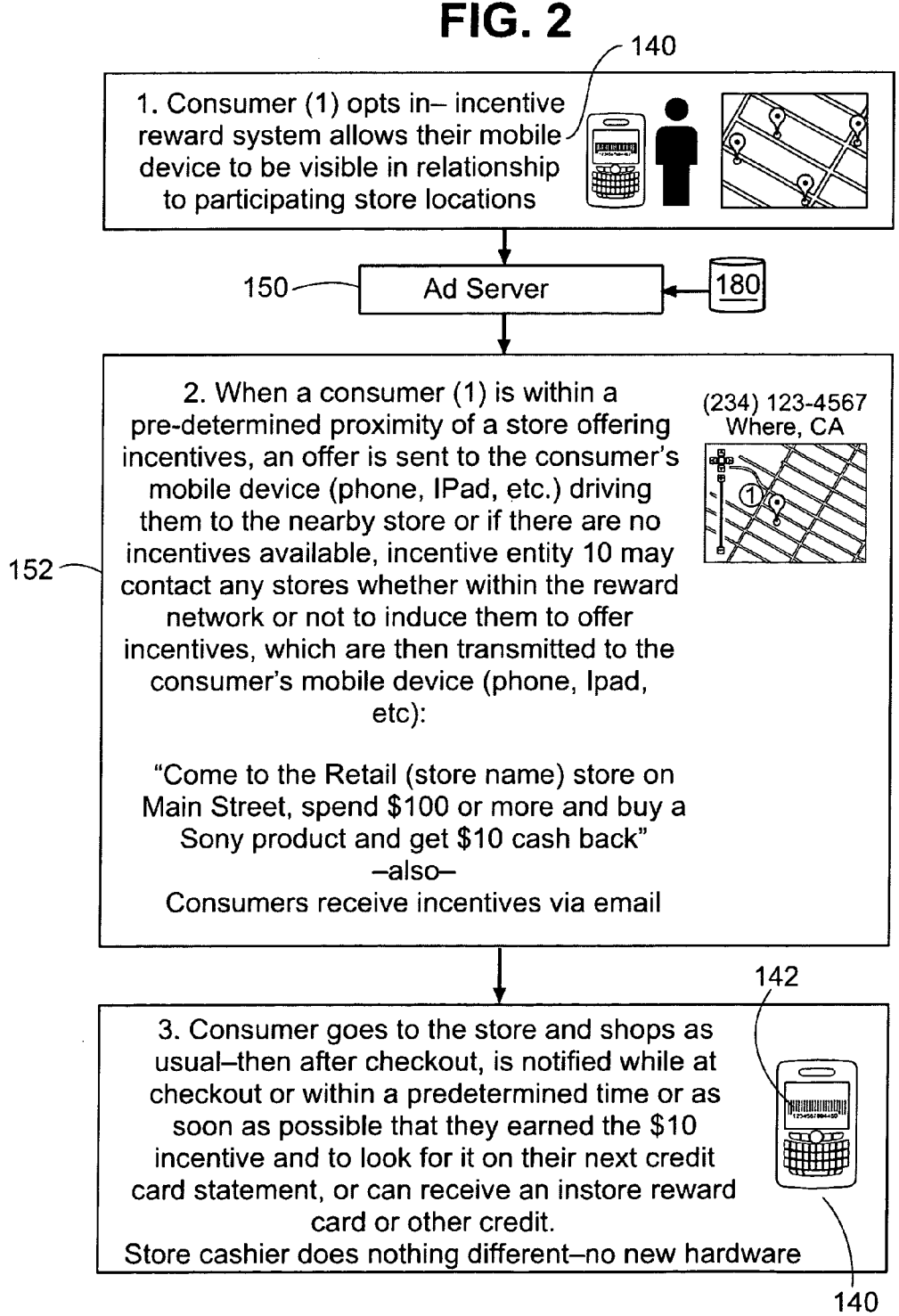

ELECTRONIC COUPON CREATION DEPLOYMENT, TRANSFERENCE, VALIDATION MANAGEMENT, CLEARANCE, REDEMPTION AND REPORTING SYSTEM AND INTERACTIVE PARTICIPATION OF INDIVIDUALS AND GROUPS WITHIN THE SYSTEM

COPYRIGHT NOTICE

A portion of the disclosure of this patent document contains material which is or may be subject to copyright protection. The copyright owner has no objection to the facsimile reproduction by anyone of the patent document or the patent disclosure, as it appears in the Patent and Trademark Office patent file or records, but otherwise reserves all copyright whatsoever in all forms currently known or otherwise developed.

BACKGROUND OF THE INVENTION

The present invention relates generally to electronic commerce ("e-commerce") systems and media platforms which may be either mobile or non-mobile (eg. PCs, etc.) to assist in and become part of a marketing network, as well as their use in conjunction with a social communications network to permit individuals and groups ("Participants") to interactively participate in virtual advertising and promotion. More specifically, the present invention relates to virtual advertising and promotion via the use of electronic coupons, and more particularly a method and system for creating, deploying, transferring, clearing, managing, redeeming and reporting on the use of electronic coupons, rewards or virtual electronic rebates ("VeeBates") over electronic networks. In this context, a coupon is any ticket or document, whether in tangible, electronic or virtual format, that can be exchanged for a financial discount, rebate or other similar benefit when purchasing a product or undertaking a requested or "pushed" activity and/or obtained ("pulled") in order to receive a benefit.

The present invention also relates to the obtaining and use of information about actions taken by Participants to permit targeted VeeBates. The present invention further relates to the transfer and/or resale, auction and/or the barter of VeeBates between Participants and the use of VeeBates to permit other persons to become Participants.

The present invention also relates to the use of VeeBates individually and/or within a social network environment, including, but not limited to their use as virtual funds, divisible funds, charitable donations, group common interest aggregation funds, alternate currency funds and transferable virtual assets. Within the social network environment, VeeBates can also be used as direct and indirect motivational elements by permitting others within the social network environment to be advised as to what one of the members is doing or has done and the resultant effect. Thus, members can be told that another has received a VeeBate for having purchased something (or been "pushed" to purchase or do something) and that they can similarly participate. This can further be enhanced by the use of social network "influencers" who are individuals who are followed by others within a social network and whose actions, activities and comments carry weight and cause others to follow and often emulate what the "influencers" do.

In a traditional retail marketing situation, a coupon is a advertisement based promotion, usually in a paper form, that can be exchanged for a financial discount or rebate when purchasing a product or service. C W Post first introduced the concept of a coupon in the United States in 1909 in conjunction with the sale of breakfast cereals and other products. It was designed to help promote the sale of the particular product and often also promote the sale of related products from the same manufacturer.

Coupons are often widely distributed through mail, magazines, newspapers and the Internet and are designed to be redeemed at a retail establishment when the goods or services to which they relate are purchased. Customarily, coupons are issued by manufacturers of consumer packaged goods or by retailers, to be used in retail stores as a part of sales promotions.

Various sales promotion mechanisms exist like prizes, contest, sweepstakes, rewards, games, free samples, product warranties, tie-in promotions, loyalty points, cross-sell, up-sell, premium, memberships, card discounts and gift certificates. These have been used for a long time, to retain loyal customers, increase the repurchase rate of occasional items, attract new buyers, manage inventory and gain market. We refer to all these mechanisms and others, such as instant discount which is similar to haggling or negotiations in the real world, as "coupons" in this invention.

With the advent of Internet shopping, the electronic equivalent of coupons have also come into existence. Internet coupons have become very popular as of late, because the cost is borne by the user (who has to print the coupons themselves) rather than the businesses issuing the coupons. There are generally three types of models that are currently possible (although others which may become operative later are within the scope of this invention):

(a) coupons that are issued at an e-commerce site and redeemed at a physical store;

(b) those issued and redeemed at a single e-commerce site; and, (c) others that are issued at one e-commerce site and redeemed at another e-commerce site.

The most general electronic coupon generation, presentation, redemption and clearing system should allow a consumer to collect electronic coupons while doing online shopping, or otherwise visiting an e-commerce site, from various e-commerce sites and redeem these coupons online at any e-commerce site or physical store, satisfying the purchase conditions of the offer. The clearing between the issuing and redeeming e-commerce sites should also be electronic, whether off-line or online. The issuing e-commerce site is commonly referred to as the manufacturer and the redeeming e-commerce site is referred to as the retailer.

However, there can also be different classes of coupons based upon the identity issuing authority (i.e. manufacturer or retailer), whether the coupon is targeted to a set of potential customers or untargeted, and whether the number of coupons to be distributed is limited or unlimited. The various classes of coupons serve different purposes. For example, coupons issued by a manufacturer to a group of loyal customers in limited numbers could be intended to retain those loyal customers. Coupons issued by a manufacturer in untargeted mass distribution could be intended to attract buyers for a new product, and coupons issued by a retailer in untargeted limited distribution could be intended to attract customers to a retail outlet.

Normally, when a manufacturer or a retailer issues coupons on a product or a service, a coupon is expected to be used only for that product or service. To save coupon creation and management costs, or to attract new buyers, a manufacturer or retailer may decide to honor the coupons issued by another party. This is referred to as cross-coupon honoring.

In a generic form, electronic coupon systems must allow a buyer to collect electronic coupons while doing on-line shopping (or otherwise visiting an e-commerce site) from various e-commerce sites, and to redeem these coupons on-line at any e-commerce site or physical store, satisfying the purchase conditions of the offer.

Currently, there are several categories of coupon providers within the market. Loyalty coupon providers are usually reliant on others within the value chain and are heavily anchored to online malls, where the transactions are seen at or near real time. They are unable to view offline or in-store offers without being associated with an issuing bank or other institution. Although they might want to provide in-store merchant benefits, they are generally not capable of doing so and are only capable of offers that are a flat percentage. Examples of such entities are Edo Interactive, Cardlytics and Vesdia.

Another category of coupon providers are those who provide mobile coupons to consumers. These mobile coupon providers generally work with a manufacturer or retailer to send location based offers. They are concerned only with the delivery of the offer and not its redemption. Thus, these mobile coupon providers send off-line, merchant funded offers and provide downloadable applications to the mobile devices. However, they rely on bar coded delivery, thus forcing point of sale ("POS") revisions, either by manual entry of the coupon specifics or a change in the hardware or software at the POS. Examples of such entities are Cellfire, HipCricket and Yowza.

Internet sites have coupons that can be used on line. Examples of companies which provided on line coupons include Cool savings (www.coolsavings.com), E-centives (www.ecentives.com) and Catalina Marketing International, Inc. (www.catalina-marketing.com). Several patents have been issued (e.g., U.S. Pat. Nos. 5,761,648; 6,321,208; and 6,584,448). These companies and others provide the capability of targeting and delivering on line print-at-home coupons, or coupons that are printed in-store, to motivate in-store sales. On line retailers usually refer to Internet coupons as "coupon codes," "promotional codes," "promotion codes," "discount codes," "key codes," "promo codes," "shopping codes," "voucher codes" or "source codes." Internet coupons typically provide for reduced or no cost shipping, a specific dollar or percentage discount, or some other special offer to encourage reward member 1s to purchase specific products or to purchase from specific retailers.

U.S. Patent Application Publication No. 20060194569 discloses a process for delivering electronic coupons over a wireless network. A wireless network enables user registration, during which the user provides profile information, such as user name and address, etc, to an administration of the wireless network, such as at a Wifi hot spot location, the wireless network then associates, the user with his/her profile information submitted during registration. The profile information is used to identify targeted or personalized electronic coupons for the user, and those targeted electronic coupons are transmitted to the user over the wireless network. The user selects one or more of the targeted electronic coupons, and transmits this selection over the wireless network to a dedicated server, which transmits a request to the user, who then inputs a code, such as a mobile telephone number or an access code for a PDA, associated with the mobile communication device then being used by the user. Upon receipt of this code, the server within the wireless network, then transmits information associated with the selected electronic coupons to the mobile communication device associated with the inputted code. Such information, such as a unique coupon code and/or information summarizing the coupon and the goods or services to which it relates is sufficient to enable a store to clear the selected coupons during an in-store checkout procedure. However, the retailer continues to be intimately involved in the redemption and clearing process, thereby increasing the error factor and cost to the retailer. It may also result in customer dissatisfaction in the event that the retail employee does not properly input data or otherwise causes the clearing to be delayed.

U.S. Pat. No. 6,993,326, to Link et al discloses a method for transmitting advertisement coupons associated with respective advertisers over a wireless network to wireless communications devices. The wireless network is in communication with an advertisements database including advertisement coupons and a user database including identification data of wireless communications device operating in the wireless network. Advertisement coupons to be transmitted to the wireless communications device are stored in a pending database and an advertisement coupon is transmitted over a reverse control channel. The transmitted advertisement coupon is from an account associated with the respective advertiser sponsoring the advertisement coupon, or may be from a storage database containing such coupons.

Traditional distributors of coupons are similarly turning to electronic marketing to permit reward member 1s to access a data base and obtain coupons or "electronic certificates" over online networks. In particular, News America Marketing Properties has found that consumers are gaining direct access to data bases for information and entertainment, whether through phone lines and coaxial cable or by wireless connections from cell systems and satellites. With this so-called "online" access, consumers can use data bases for a range of activities at virtually any time. Besides granting freedom to the consumer, online access gives added efficiencies to companies merchandising products and services, whether those products are sold directly to the consumer by mail or in a store.

At the same time, various types of transactions are currently consummated using certificates such as coupons, tickets, etc. These certificates typically contain transaction data describing the particular transaction (e.g., in the case of a coupon, the transaction data would include a product description, the coupon amount, and the expiration date). These certificates also typically contain identification data such as various numbers, letters, barcodes or other symbols sufficient to uniquely identify each certificate.

As noted by Frost & Sullivan in its December 2009 report entitled *When Mobile Coupons Replace Paper Coupons, Everybody Wins:*

"Mobile coupons are the next step in the evolution of the coupon industry. They present new opportunities for the mass distribution of promotional messages to a large number of reward member 1s. Some of the drivers of mobile coupon solutions are as follows:

Solving the portability problem of paper and Internet coupons consumers always have their mobile phones with them Presentation of relevant, personalized offers to reward member 1s Extremely low cost of campaign Pervasiveness of text messaging Some possible implementations of mobile coupon solutions are as follows:

Unique numerical coupon codes downloaded and managed by dedicated applications on mobile handsets.

Barcodes downloaded to the handset in different formats and read at the POS by capable readers. Interestingly, the reader itself could be a camera-equipped mobile hone.

Special numbers or UPCs downloaded to the handset and redeemed by the visual or electronic confirmation of the coupon code.

Directional coupons—these are special uniform resource locators (URLs) embedded in barcodes, distributed either in print or available on the packaging of products. They are scanned by camera-equipped mobile phones that also have a software client to decode the information. The URL is then used by the web browser in the mobile phone to establish a connection to a relevant website (or to the premium mobile content itself, if available at a discount).

The use of near field communications (NFC) RFID chips in a phone, so that a promotional coupon can be "read" by the phone and then used at the store. This is not expected to happen until retailers install NFC readers in retail outlets.

One of the most significant challenges for barcode-based mobile coupon solutions is the implementation of new scanning hardware at the retail POS. Such hardware is expensive to install; moreover, the lack of volume has not yet been able to justify the investments in such solutions. This has been a major cause for the limited adoption of mobile coupons at the retail POS. Successful mobile coupon solutions should require little or no change at the retail end for maximum adoption."

New America has determined that there was a need for creation of an online "electronic certificate" that can be used for promotional or transactional purposes, much as coupons have been used in such traditional marketing vehicles as newspapers and mail packs. Beyond offering a discount as an incentive to buy a feature product, the coupon is also currency, printed in quantities limited by the issuer and often carrying unique serial numbers, expiration dates and "source codes" which indicate the means by which it was distributed (e.g. newspaper, mail list, in-store dispenser, etc.), so issuers can track the effectiveness of each marketing medium.

Known coupon dispensing systems, for example, fail to interactively communicate between a service center and a third party, as pointed out in U.S. Pat. No. 5,303,197 to Axler. While the Axler patent permits an operator to periodically "visit" a dispensing machine, this does not allow "real time" interactivity (e.g., it does not permit the operator to access and analyze demographical data contemporaneous with its input). Nor does Axler envision the creation of an online "electronic certificate" and system for incentive and consumer matching through the retailer sales log and a card issuer transaction log, with concomitant consumer reward application and social communication, as is contemplated and disclosed by one aspect of the current invention and as will be described as an example below.

U.S. Pat. No. 7,401,032 shows a data processing system and method which seeks to emulate the attributes of a coupon over an online network (i.e., an "electronic coupon" is created). The direct access to consumers provides issuers a greater degree of control in targeting the offer, restricting its use and tracking both the selection and redemption process and makes it possible for service providers, such as restaurants and hotels, to use an online electronic certificate as a promotional means and a way to lower overhead in providing such transactions as dining, travel and ticket reservations. However, the system requires the consumer to access and select the coupon, in much the same way as they would select coupons from a newspaper or magazine. This continues to result in the creation of ads and coupons that may be of no significance or use to consumer or which may not be effectively accessed by the consumer at the time they are needed or wanted (e.g. during the redemption process). Moreover, such coupons continue to include the redeeming entity (usually the retail store, hotel or restaurant, by way of example) in the verification and redemption stream and require it incur the overhead, albeit somewhat reduced, of reclaiming the coupons.

U.S. Pat. No. 5,420,606 to Begum et al. for "Instant Electronic Coupon Verification System" describes an instant electronic coupon verification system for a single physical store, where the store provides shoppers with an electronic device to view, select and store from a plurality of coupons and later redeem the coupon on reaching a checkout counter, based on items purchased. This is also limited only to physical stores and does not talk about any targeted coupon distribution.

The effectiveness of coupons can be greatly improved by targeting a specific profile of customers for coupons of specific products. Among targeted coupons, U.S. Pat. No. 5,502,636 to Clarke for "Personalized Coupon Generating and Processing System" proposes a personalized coupon generating and processing system which identifies a group of consumers, that are likely to be responsive to coupons of predefined products and then distribute the coupons.

U.S. Pat. No. 5,909,673 to Gregory for "Method and System for Creating Site Specific Coupons at a Plurality of Remote Locations Which are Controlled by a Central Office" proposes a central server connected to multiple remote sites to allow the retailers to be able to customize discounts and coupon details according to the particular store location. A general coupon template is loaded onto the central server alone, with site specific information to be printed on each coupon. A particular remote processing station at a remote site can call in to the central server and download the general coupon template and the site specific information for that particular site. The remote processing station then combines the template with the site specific information and prints the site specific coupon. These inventions describe mechanisms only for generation of targeted coupons, without any mention of online coupon redemption, verification and clearing.

Recent wireless couponing techniques and processes are reflected in U.S. Pat. No. 7,308,254 to Rissanen for "Wireless Electronic Couponing Technique" and U.S. Pat. No. 7,640,183 to Burns for "Electronic Coupon Processing System". The former describes a methodology comprising and supporting wireless coupons that may be downloaded, viewed, credited (used) in electronic format throughout their distribution life cycle. The coupons are stored, carried and used in a wireless mobile terminal such as a mobile phone. The electronic coupons may be delivered to the terminal by methods including: downloading to the terminal from the Internet; pushing to the terminal by e-mail-type messages; downloading to the terminal by a short-range radio link such as Bluetooth; or scanning from a printed paper by using a (built in or external) scanner in a mobile terminal, or via an infrared link or by other methods. They may also be downloaded from a wireless LAN connection.

The patent indicates that an important distinction from previous Internet coupons and print coupons is the fact that the coupon files are stored in the memory of the mobile terminal, or a coupon ID number string is stored in the mobile terminal and the visual representation may be downloaded separately from a network server as needed or when excess bandwidth capacity exists. Thus, the coupon files are easily carried by the consumer at all times, and are readily available as the need rises (like when visiting a retail store, a restaurant, gas station, etc.). During a visit to a retail outlet, the consumer takes out his/her mobile terminal, initiates a coupon match sequence that compares the coupon files stored in the terminal with the promotions effective at the retail outlet. If a match is found, i.e., the consumer, carries an electronic coupon that justifies a discount, the point of sale (POS) terminal calculates a discount to the prices of the goods to be purchased, or grants other specified benefits to the coupon bearer. The mobile terminal and the POS terminal may exchange the electronic coupon information in the following ways: a wireless digital short-range radio link such as Bluetooth, via an infrared data link, or via bar code scanning by the POS terminal from the mobile terminal display.

The second identified patent describes a coupon database containing coupon information that is associated with a specific consumer. This coupon database is operated in conjunction with a system for recording information concerning products that are purchased by a consumer at a particular store. Using the new generation of bar code scanning registers, the information from the register system is reconciled with information from the coupon database, in order to give the particular consumer credit for coupons that are attributed to his or her account. The coupon database is subsequently updated to reflect the transactions and the discounts given to the consumer. The consumer information, including both the information relating to coupons and the information relating to products purchased, can be added to a database for marketing analysis. This consumer information would be associated with a particular consumer. The compilation of this information for various reward members at any store provides invaluable data that can be used to improve products or marketed independently. The information generated for each consumer at the register when the consumer makes his or her purchases and the coupon database reconciliation is then be forwarded electronically to the manufacturers for rebates to the vendor. In use, a particular consumer "clips" or acquires coupons and brings them in to a particular store for scanning or other means of entry into the coupon database. The coupon data entry can be performed by the consumer or by the store. See also: U.S. Patent Application Publication No. 2009/0307067 to Obermeyer for "Location Based Coupon Delivery System".

Various methods and systems have been proposed for electronic coupon generation, management and redemption at a single e-commerce site. U.S. Pat. No. 5,894,520 to Nielsen for "Method and System for Regulating Discounts on Merchandise Distributed Through Networked Computer Systems" describes a method and a system for regulating discounts on merchandise, at a vendor location, through networked computer systems. The system includes a user computer and a vendor computer connected via a network when a user purchases merchandise, the vendor issues an encrypted discount coupon for repurchase of the merchandise. When user desires to repurchase the merchandise, user sends a request to the vendor along with the encrypted coupon. The vendor verifies the coupon and gives the discount. An earlier paper by the authors (M. Kumar, A. Rangachari, A. Jhingran, and R. Mohan, "Sales Promotions on the Internet", Third USENIX Workshop on Electronic Commerce, Boston, 31 Aug. 3 Sep. 1998, pp. 167 176) describes a form of sales promotion for online merchants called e-coupons. A buyer need not print e-coupons as they can be captured electronically in an electronic coupon-wallet, and later redeemed electronically on the same on-line store. They solve the issue of targeted, limited online distribution and redemption of electronic coupons at a single online store, but it is not clear how they can handle coupons issued by a manufacturer which may get redeemed at any online store, nor does it disclose any redemption process which by-passes the traditional active involvement of the retailer or permits issuer based redemption in a matched offer context.

Consumer online activity may also be tracked to permit offers to be presented to the consumer. U.S. Patent Application Publication No. 2009/0216579 to Zen for "Tracking On-Line Advertising Using Payment Services" discusses a system wherein using a payment service is used to identify completion of activities associated with offers extended to users through online advertising. Online activity of a user is tracked, and offers associated with advertisements presented to the user are identified. The offers generally include rebates, and/or incentives extended to the user in exchange for the user performing a desired activity, such as purchasing an advertiser's product or service. Information regarding the offer (and, in some cases, the online activity generally) is stored. Additionally, information regarding the offer is communicated to a payment service that facilitates payment using payment cards, such as credit cards and debit cards, for instance, or other payment mechanisms. Through transactions performed by the user using the user's payment card or other payment mechanism, the payment service identifies when the user has performed the activity associated with the offer. In some embodiments, information regarding completion of the activity is associated with the information regarding the offer and/or the user's online activities. Additionally, in some embodiments, the rebate and/or incentive for the offer is provided to the user based on completion of the desired activity. See also: U.S. Patent Application No. 2009/0287558 to Seth for "Electronic Coupon Tracking".

Several centralized service provider based systems have also been proposed for giving merchandise discounts. These systems do not issue any coupons to the customer, but just offer various discounts when the customer visits the retailer store for shopping. U.S. Pat. No. 5,185,695 to Pruchnicki for "Method and System for Handling Discount Coupons by Using Centrally Stored Manufacturer Coupons in Place of Paper Coupons" describes a method and system for handling discount coupons by using centrally stored manufacturer coupons in place of paper coupons, to save costs of printing and distributing and clearing paper coupons. The method and apparatus includes a central processor that receives information of product type, validation period and coupon value from manufacturers and produces a central coupon list of available coupon discounts. The central list is transmitted to retailers who produces a local coupon list based on the central list containing only those manufacturers and product type which the retailer holds for sale. The customer buys a product and as the product is moved through the checkout station, coupon discount, if any applicable, is deducted from the retail price. The central processor directly bills the manufacturer or transfers funds.

U.S. Pat. No. 5,924,080 to Johnson for "Computerized Discount Redemption System" describes a similar method of giving merchandise discounts by using a membership system comprising of a centralized system provider, multiple manufacturers, multiple merchants and multiple customers. But none of these systems are doing any targeted discounts; they are just giving discounts on the customer purchases without issuing any coupons to the customer at all, hence they do not describe any coupon distribution, redemption or verification mechanisms.

Another mechanism of giving merchandise discounts is in the form of transaction points. U.S. Pat. No. 5,923,016 to Fredregill et al. for "In-Store Points Redemption System &

Method" describes a computer implemented consumer transaction point accumulation system in which a consumer earns and accumulates points immediately for immediate use during transactions at participating retailer outlets, wherein at each transaction, a customer's identification number is transmitted to a central system which stores customer records including a customer balances of points accumulated to date. This does no targeting and is only limited to one form of coupons i.e. transaction points and is not a solution for a generic coupon that can be in the form of price-packs, cross-selling, gift certificates, and the like, nor does it do any redemption which reduces the retailer involvement in the redemption or verification process An e-commerce site, www.planetu.com, provides targeted offers that the reward member 1 has the opportunity to select. After selecting their offers online, consumers receive them either by mail or redeem them at supermarkets with modem point-of-sale systems by swiping their frequent shopper card, the offers being automatically deducted at the point of sale. This system does targeted coupon distribution, but coupons can be redeemed only at physical retail shop, thus continuing to involve the retailer in the redemption, verification and crediting process. Besides, it requires the reward member 1s to have a frequent shopper membership and the central server to maintain all coupon and reward member 1 selection details.

Smart-card based coupon management and redemption systems have also been proposed such as U.S. Pat. No. 5,727, 153 to Powell for "Retail Store Having a System of Receiving Electronic Coupon Information from a Portable Card and Sending the Received Coupon Information to Other Portable Cards" for single physical retail store, U.S. Pat. No. 5,905, 246 to Fajkowski for "Method and Apparatus for Coupon Management and Redemption", and U.S. Pat. No. 5,380,991 to Valencia et al. for "Paperless Coupon Redemption System and Method Thereof" for targeted merchandise price markdown. The limitation of these systems is that they only talk about physical stores and the user has to carry a smart card.

An electronic coupon issuing, redemption, verification and clearing system, was proposed in the U.S. Pat. No. 5,855,007 to Jovicic et al. for "Electronic Coupon Communication System". This system comprises a first Internet node, an Internet coupon server and an Internet coupon notification center. The Internet coupon server generates a unique Internet coupon using a coupon generation process. The Internet coupon server accepts an on-line selection of one of the available unique Internet coupons from a user of the Internet node and transmits the coupon back to the user's printing device or e-mail storage. It then records the transaction in its coupon database and notifies the transaction to the Internet Coupon Notification Center. The Internet Coupon Notification Center subsequently records the transaction. Furthermore, a coupon redemption center can electronically verify coupon validity and record coupon redemption by communicating with the Internet Coupon Notification Center. It handles online targeting, generation, redemption and verification of electronic coupons between a manufacturer and a plurality of retailers, but it is not clear how it handles frauds such as a customer or a retailer colluding with the Notification Center or coupons from a plurality of manufacturers.

Systems are proposed in U.S. Patent Application Publication No. 2009/0265228 to Sterling for "Point of Sale Coupon System and Methods" which can enable merchants and issuers of credit cards or other payment devices to cooperate in offering incentives to consumers. For example, a consumer who uses a particular credit card at a particular merchant may be offered a coupon, discount, or other kind of incentive to be applied to a future purchase made with the same card at the same merchant. The issuer and merchant may participate in such a system in order to encourage reward consumers to repeatedly use the issuer's card and to repeatedly patronize the merchant. In accordance with embodiments of the invention, consumer is given the opportunity to accept or decline the offer. The merchant, issuer, or both, may track the acceptance rate of the offers for marketing purposes, for example to learn which kinds of offers are most often accepted and therefore may be most effective at generating repeat patronage. Also, offers that are declined need not be considered future obligations on the part of the offeror. Conveniently, the offer is presented to the consumer on a display screen of a content-capable point of sale device, and the consumer's indication of acceptance or decline of the offer is read using the point of sale device.

Similarly, U.S. Patent Application Publication No. 2009/0254428 to Sterling for "Systems and Methods for Delivering Advertising Content to Point of Sale Devices" discusses a system for delivering content to a user is disclosed. The system may include a point of sale device, a wide area network, and a payment processing system. The point of sale device may be configured to receive information regarding a transaction, and communicate content to the user. The wide area network may be in communication with the point of sale device. The payment processing system may be in communication with the wide area network, and may be configured to receive the information regarding the transaction, determine advertising content based at least in part on the information, and transmit the determined advertising content to the point of sale device.

There are presently in excess of over one billion global mobile subscribers and over 100 million mobile data subscribers. Subscribers having multimedia messaging services (MMS) equipped mobile terminals such as smart phones, phone enabled PDA's, and phone enabled pocket PC's (mobile terminal) can access the Internet via various wireless protocols (e.g. wireless access protocol (WAP), i-Mode, etc.) to download data ("content") from websites. Content includes text, audio and still and video images. MMS is an extension to short message service (SMS) protocol, and it defines a way to send and receive wireless content.

Many of these terminals are able to download and display streaming video over various "third generation" (3G) GSM (global system for mobile communications) based high speed data networks (e.g. "EDGE"—Enhanced Data Rates for GSM Evolution, "EV-DO"—Evolution Data Optimized, "UMTS"/"W-CDMA"—Universal Mobile Telecommunications System/Wideband Code Division Multiple Access) Subscribers are charged for the quantity of content downloaded, the time spent downloading the content, or a flat monthly fee. Fourth generation devices are rapidly making inroads into the bandwidth and have increased the functionality of what can be accomplished with a mobile device.

Bluetooth is a standard Wireless (short range radio link) technology that operates in the unlicensed 2.4 GHz ISM band and which allows users to make connections between like enabled mobile terminals and computers. It is a global standard that is supported by leaders in telecommunications and reward member 1 electronics. According to Bluetooth Special Interest Group (SIG) over 1 million enabled devices ship each week, and SIC estimates that as of 2007 nearly 50% of all mobile phones in the United States were Bluetooth enabled.

Competition between wireless service providers is fierce. Service providers compete on points of differentiation, including terminal variety, applications, "coverage" (the cellular geographic service area—CGSA) and price, both of the terminal itself and calling plans. To provide differentiation and to enhance the user experience, service providers enter into agreements with Internet service providers to enhance the subscriber's mobile Internet experience. Service providers and Internet service providers can earn money for advertising presented during a wireless Internet session, and advertisers may motivate someone to buy their product/service, build brand awareness, etc. However, consumers are not always on the Internet and often are in situations where an advertiser would wish to attract consumers to their product, build brand identity, and make sales. For example, persons in malls are often there to spend money, but may not be aware of a sale in a particular department store. Visual advertising, at eye level, promoting a sale at a store in the mall may catch the eye of a shopper while standing in line waiting to make a purchase. Sandwich board advertising was the location-based advertising of yesteryear. Today, service providers using various location-based technologies, handset centric (e.g. global positioning system (GPS), cell of origin (COO)) and network technologies (e.g. time of arrival (TOA)) to deliver information (i.e. advertising) to mobile terminal users that is relevant to the user's location (e.g. nearest ATM to subscriber). The newly informed person may go to the store advertised and make a purchase.

Location based advertisement and promotion, along with the use of data both obtained and derived there from is suggested in U.S. Pat. No. 7,668,832 to Yeh, et al. for "Determining and/or Using Location Information in an Ad System". The patent recites that the usefulness, and consequently the performance, of advertisements are improved by allowing businesses to better target their ads to a responsive audience. Location information is determined (or simply accepted) and used. For example, location information may be used in a relevancy determination of an ad. As another example, location information may be used in an attribute (e.g., position) arbitration. Such location information may be associated with price information, such as a maximum price bid. Such location information may be associated with ad performance information. Ad performance information may be tracked on the basis of location information. The content of an ad creative, and/or of a landing page may be selected and/or modified using location information. Finally, tools, such as user interfaces, may be provided to allow a business to enter and/or modify location information, such as location information used for targeting and location-dependent price information. The location information used to target and/or score ads may be, include, or define an area. The area may be defined by at least one geographic reference point (e.g., defined by latitude and longitude coordinates) and perhaps additional information.

Similarly, wireless and mobile technology is being suggested to enhance the customer experience and provide targeted advertising over wireless communication networks. U.S. Pat. No. 7,580,699 to Shaw for "Network Systems and Methods Utilizing Mobile Devices to Enhance Consumer Experience" discusses a method for providing and accessing membership accounts via a mobile device. The method includes sending a member identification request to a mobile device upon the mobile device being detected by a network. If a member identification is stored in a memory of the mobile device, the mobile device generates and sends a Member identification response including the member identification. Upon receipt of the member identification, the member identification is authenticated and the mobile device user is authorized to access a membership account associated with the member identification. If, however, no member identification is stored in the memory of the mobile device, the mobile device generates and sends a new member identification request requesting that a new member identification be issued for the requesting customer. Upon receipt of the new member identification request, a new member identification is generated and sent to the mobile device for storage in the mobile device memory. The mobile device user is then authorized to access a membership account associated with the new member identification.

U.S. Pat. No. 7,526,278 to Link for "System and Method for Providing Short Message Targeted Advertising over a Wireless Communication Network" suggests a method for transmitting a message over a wireless network to a wireless communications device. A plurality of messages are stored in a database, wherein each stored message is associated with one or more locations. Location information of a wireless communications device is detected, and a message in the database associated with the detected location is selected and transmitted to the wireless communications device. Local advertisers register to advertise on certain wireless communications devices that are in close proximity to the advertiser. As a enters a cell site that is near the location of the advertiser, the wireless network delivers a message to the wireless device that is specified by the local advertiser. An acknowledgement signal is then received by the network, and the local advertiser's account is charged for transmission of the advertisement.

However, privacy remains a concern, as many people do not like the idea of being "tracked". Therefore, there remains a need to respect a subscriber's privacy while still providing advertising that is both easily viewed and location based. Many advertisers have coupons printed in newspapers to build brand awareness. Because it takes time to purchase a paper, find the coupon, cut the coupon, and transport the coupon to a store to redeem it. While consumers can save money-using coupons, many do not think the effort is worth it. A need remains for a better way to distribute and redeem coupons and to permit them to be used by others in the event that the particular individual to whom they are first directed decides that the coupon or incentive would be better used or more applicable to a member of his social network.

Many service providers already deliver free informational messages (i.e. advertising) to their customers at no charge. There is usually no immediate benefit to the receiver of this free information, and so there remains a need for the subscriber to get some benefit for having his terminal display it. Mobile service providers who present advertising on mobile terminals, generally present advertising to only one person at a time, the subscriber. This is true even if the subscriber is in a crowded public area or is part of a social network which, by definition, enjoys many similar attributes and would respond similarly to the advertisement or promotion. Therefore there remains a need to present advertising to a larger audience and concomitantly obtain that larger audience as part of the provider or advertiser database.

Internet selling has traditionally been done by online retailers selling products directly to purchasing individuals or groups. Amazon.com.® is an example of an e-commerce website that specializes in selling a variety of products. U.S. Pat. No. 5,960,411 relates to a method and system for placing a purchase order via a communications network. Other e-commerce sites specialize in selling a particular type of product or service, such as the Apple® store or Dell.com.® which both sell different varieties of computers and computer products. More recently, businesses have emerged that offer customers comparison shopping, enabling the customer to browse a variety of e-commerce sites for the best price or customer service when they are looking to purchase. MySimon.com® is an example of this. Google's Froogle® service is an example of a search engine that aggregates products from a variety of e-commerce sites and offers them in a single view to the potential customer.

These approaches are very different in their respective business models. In the first case, the online service provides the listing and handles the transaction. In the second case, the online service merely provides information, and may receive referral fees from the e-commerce site that completes the transaction. However, both of these approaches aim to achieve the same goal: to provide a potential buyer with a purchasing path that begins with the buyer's, interest in a product or service. Along this purchasing path, the user may encounter product reviews or user feedback, which is, at best, the opinion of a stranger and, at worst, the contrived words of a biased party.

Also, an increasingly popular feature on online communities is the ability for a user to express his/herself using a variety of creative tools. For example, websites exist that allow users to create a virtual character, complete with clothes, accessories, and furniture. These sites are known collectively as avatar sites. A preferred embodiment of this invention would treat a user's previously purchased products and services and desired products and services as a means of self expression, and the web as just another place where we can express our individuality and conduct day-to-day social interaction.

One example of known system is described in U.S. Pat. No. 6,175,831, which relates to a networking database containing a plurality of records for different individuals in which individuals are connected to one another in the database by defined relationships. This system, however, does not enable the individuals to provide word of mouth sales referrals by including marketing brands as part of the individual's identity in the database.

Another example of a known system is described in U.S. Pat. No. 6,269,369 which relates to a network-computer-based personal contact manager system that enables users of networked clients to maintain and update user information that is stored in a relational database. The system allows each user to specify, on an individual basis, which contacts are permitted to access their user information. The system also allows users to find contacts based on common group affiliations and notifies users when there are coincidences in their data.

Additional descriptions of the background of one aspect of the present invention may be found in the following books: "The Tipping Point: How Little Things Can Make a Difference" by Malcolm Gladwell, Back Bay Books (2002); and "Kellogg on Marketing" (Edited by Dawn Lacobucci), John Wiley & Sons (2000). Another reference related to the use of advertisements online and related pricing issues is described, for example, in connection with "GOOGLE® AdWords®.

However, each of the above systems, as well as traditional e-commerce suffer from the lack of relevant feedback from trusted sources.

U.S. Patent Application Publication No. 2005023471 seeks to ameliorate some of these shortcomings by describing a system of word of mouth selling that identifies brands with online identities and optionally tracks access and sales histories to provide rewards. It proposes an online word of mouth e-commerce system to permit individuals or groups to decide the products and services that they wish to be associated with as part of their identity within an online community. They select and approve these products and services from their purchasing histories at various e-commerce retailers and can enrich this information with the products and services that they wish to purchase. Optionally, in return for adding their purchasing history to their profiles, individuals and groups can receive rewards in the form of gift certificates when other users purchase the product or service that the individual or group advocated. Partner e-commerce retailers implement or expose a web service API for a user importing his or her purchasing history and for dynamically extracting referral links. However, this system does not provide advertisers with the immediate use of coupons or the dissemination of those coupons among social group members, nor does it provide redemption which minimizes or eliminates the retailer involvement, while permitting the use of existing data and communication streams and device without the need to obtain new hardware.

Wireless networks are now routinely in communication with the global computer network, providing network users with expanded services such as Internet access through their wireless handheld devices. Through this same link, wireless network providers can provide third parties with the identity and location information that the network provider is (or will be) required to monitor thus permitting the third parties to identify a network user and track that user's every movement. This information enables them to profile customers and to present more individualized products or services. Advertisers, if permitted by the user, may target users and send information from the advertiser or third party based upon a user's location. Targeting users with information from third parties, such as advertisers, is particularly useful when the user is active and the information is being sent to a mobile communication device.

BRIEF SUMMARY OF THE INVENTION

Exemplary systems are shown for providing coupons, rebates, rewards, discounts and advertising (all of which are hereinafter subsumed in and may be have the alternative designations "advertisements" or "coupons") to individuals who opt into the incentive process or are opted into it via a pre-existing relationship with a group, bank, charitable institution or group, affinity, group or other entity. Methods are also provided for providing coupons and/or advertising to such individuals including persons within a social network. The systems and methods employ, among other things, an advertising/couponing engine or processor configured to provide a virtual ad or coupon which may be a function of both independent and dependent variables and constraints which may include location, information about the individual and information of any relationship between a social network, its members and the advertiser. The processor may employ an adaptive process specification with allowed and disallowed actions and constraints to generate the coupon or advertisement. As a further part of the systems and methods employed, the classified advertisement may contain a coupon or similar redemption feature which may be employed by the individual to gain the benefit upon the taking of the prescribed action such as purchasing an item or items or going to a particular location. The redemption and concomitant benefit may be correlated and matched to permit the individual to obtain the benefit without the need for having the redeeming advertiser or retailer actively participate in the redemption process. Using such advertisements and coupons is generally referred to as "pushing".

Exemplary systems are also shown for using various criteria as well as location information to transmit advertising and related information to a communication device so that a coupon or similar redemption feature is made available to the individual. The individual may obtain the benefit upon the taking of the prescribed action. The benefit may be directly applied to the individual's account or such other place as the individual designates such as a prepaid debit card, gift card, loyalty card of another payment card, or may be shared with another individual, or transferred, in whole or in part, to another entity, such as a not-for-profit organization which the customer is supportive of, without the need for the redeeming advertiser, customer or retailer to participate actively in the redemption process. A further aspect of the invention permits the retailer/advertiser to change the coupon and promotion "on-the-fly", thus permitting it to be modified in relationship to the desired anticipated response. A further aspect of the invention permits the retailer/advertiser to conduct site specific and product specific promotions based upon SKU and other identifier information. Thus, a retailer can provide a $10 coupon at locations in Chicago and $15 in New York for the same merchandise or on the same campaign. Alternatively, the retailer can determine that its inventory of a certain product in one location is too high and can do a promotion based upon SKU data and inventory information to dynamically control its coupon and advertising campaigns.

Further exemplary systems and methods are shown in which a communication module receives classified advertisement from an advertising entity either as a result of location, predetermined information about the advertised product or service and the potential purchaser's desire therefore, or variables which indicate that the individual is desirous of or may be influenced by the receipt of such a classified advertisement which includes a coupon or similar redemption feature. Upon the use of the coupon or similar redemption feature a data entry is made in the database to confirm the use of the coupon. The data confirmation is matched to a payment or debit authorization approval confirmation entity database which had previously authorized the use of the coupon in conjunction with a credit, debit, pre-paid, cash-fill or similar card. Upon the matching of the authorization confirmation and redemption data entry, the authorizing entity issues to the individual the value of the coupon or redemption through a credit or negative debit (as appropriate) or through the creation of a gift card or loyalty card. Further, the individual may transfer, assign or otherwise request to split all or part of the incentive redemption amount to an entity other than themselves such as a charity or other organization or person(s).

In a further aspect of the invention, the coupon or redemption may be employed in online communities and social networking environments by permitting the initial recipient to transfer or otherwise pass on the coupon or redemption to others within the community and social networking environment. In such instances the advertiser will obtain the benefit of having a social association connected with the advertisement thereby giving it a higher degree of credibility to the subsequent recipient. It will also make the initial recipient an advocate for the coupon and advertisement, thereby enhancing the value of the advertisement to the particular advertiser.

As yet another part and feature of the invention, in instances where a coupon is transferred within a social networking environment or community and the subsequent recipient of that coupon redeems it in accordance with its terms, the initial recipient may be provided with a benefit, including a monetary benefit of a percentage of the value of the coupon. This provides an additional incentive to the initial recipient to transfer the coupon to a member within the social network or community who may employ it or who has a greater interest in the underlying redemption benefit. Similarly this provides an additional benefit to the advertiser in that the ultimate recipient was not one that would have been originally targeted by the advertiser. In the event that the subsequent recipient employs the coupon the advertiser will have increased its database and applicable information in terms of providing targeted advertisements.

In yet another embodiment of the invention, a system and framework is provided for permitting downstream advertising in a social network or community where the members can associate the advertisement within an individual or group to increase the brand penetration within that group where, presumably, the members have a higher probability of common interests and common consuming desires. The employment of the coupon and its redemption will further permit the authorizing entity and advertiser to gain an additional member within their sponsored advertising framework by requesting that any downstream recipients of the advertisement who employs the coupon become a member of the advertising framework.

In one embodiment of the invention advertisers may register through a central entity to advertise on wireless communication devices that are either in close proximity to the advertiser or which may fall within other criteria denominated by the advertiser. The recipient is one who has elected to participate, via an authorizing entity or similar clearing mechanism, to receive such advertisements or coupons either in conjunction with location, criteria denominated by the advertiser or as part of a social or networking community based on the number of people the individual is connected, sharing or associated with. In addition, the usage of the activity within a social network for an individual or group could also be used to determine the proper advertising matching to that individual. Further, the existing location where an individual is shopping and/or has recently shopped will also be used for advertising delivery and targeting. As the recipient either enters the location or is otherwise determined to satisfy the criteria, a message including a coupon or a redeemable notification is delivered to the wireless device. The recipient may either engage in the activity resulting in a redemption or may take other action such as forwarding it to a member of the social networking community. Upon redemption or upon taking of the action which is required, a data entry evidencing the transaction is recorded. That data entry is then compared to the data log, and upon verification that the activity is in accordance with the redemption criteria and that the coupon is valid, the recipient is notified that the redemption has taken place and an appropriate credit has been given to the recipient. The recipient is generally notified via a message which is delivered to the recipient through their mobile device or other personal computer/communication device either while the recipient is at the checkout location or subsequent to the recipient being present at the checkout location.

As a further exemplary system and method to deliver coupons, offers, incentives and other redemption feature's to a mobile wireless communication device the coupon, offer, incentive or other redemption feature is attached or added to or may become a part of the method of payment, for example the use of the charge, debit, pre-paid, cash-fill or general-purpose card, for the purpose of permitting automatic redemption when the card is utilized in accordance with the terms of the coupon offer or incentive. It is a further part of the exemplary system and method to have the sales data from the redemptive environment and the authorization information from the card correlated and compared to permit the automatic crediting of the coupon amount, offer or incentive immediately after purchase.

In yet another aspect of the invention an offer/redemption database comparison system matches the redemption of the coupon, offer, incentive or other redemption initiative to the authorization database, which, by way of an example, may be a bank which issues a charge card or a merchant acquirer or other repository of authorization data, to match the users charge activity and the offer and location of the offer target. Upon determination that the offer target and the authorization match, a credit equal to the redemption amount is given to the user in the form of a credit to the charge card (or a negative debit in the case of a debit card) or through other means such as a new debit card, or payment (in whole or in part) to a third party such as a not-for-profit organization which the customer is supportive of.

In yet another aspect of the invention an offer/redemption database comparison system matches the redemption of the coupon, offer, incentive or other redemption initiative to the authorization database, which, by way of an example, may be a bank which issues a charge card or a merchant acquirer or other repository of authorization data, to match the users charge activity and the offer and location of the offer target. Upon determination that the offer target and the authorization match, a credit equal to the redemption amount is given to the user in the form of a credit to the charge card (or a negative debit in the case of a debit card) or in the form of virtual currency or a combination of both. Virtual currency is generally used to permit an individual to create a credit system on a social network. Thus, for example, a recipient may elect to create a "pay with Facebook®" wallet into which some of the reward/coupon benefit may go. This can subsequently be used to permit the recipient to finance virtual purchases. This Facebook® wallet can then be shared with others if the recipient so chooses.

As yet a further part of the invention, the redemption amount which is given to the user in the form of a credit to the charge card (or a negative debit in the case of a debit card) or in the form of virtual currency or a combination of both may also permit the user to obtain additional virtual (or actual) credits by undertaking additional activity, such as referring another person within their social network or completing surveys or other actions to assist the merchant or provider of the coupon/incentive.

In a further aspect of the invention when employed in conjunction with a social networking community, the recipient may elect not to redeem the coupon, offer or incentive and to pass it along to another member of the social network community. If the other member of the social network community then redeems the coupon, offer or incentive and is not a person to whom the bank issued a charge card such that a match may take place, the other member may, ideally, be given the opportunity to receive such a charge card and to thereby participate in the incentive, thereby providing the bank or other issuing entity with an additional client.

It is a still further aspect of the invention that the system will also transmit via a social network(s) the activity performed by the initial recipient or the subsequent recipient of the offer through the social network the activities performed such as "John Smith just saved $35 at Best Buy using his Visa card", which transmitted message will be a direct result of the redemption activity acknowledgement from the authorizing system.

In a further exemplary system and method of the invention, a recipient who elects not to redeem the coupon and, passes it along to another member of a social networking community is still permitted to participate in a modified form of the incentive. Upon passing the coupon to the other member of the social networking community the initial recipient may either notify the issuer directly, or the fact of the transmittal will be noted upon redemption by the second person of the coupon. In such circumstances the initial recipient may receive a credit or similar benefit directly to their credit card or other prescribed method of payment for having passed a coupon which has subsequently been redeemed. By way of example, a coupon which provides for a $10 credit upon the purchase of $100 worth of merchandise at a specified retailer, if redeemed by the second member of the social networking community, would simultaneously provide a one dollar credit to the initial recipient, thus permitting them to benefit directly from their action.

As an additional part of an aspect of the invention each coupon may be given certain coding or an applet which will permit communication with a central server in order to permit both the redemption of the coupon and its subsequent verification and matching at the issuer server. Once the issuer of the card or controller of the method of payment or the authorizing entity matches their customer or non customer and the charge activity utilizing the method of payment to match the offer, the data is sent to a database and classified as Matched Offers. The Matched Offers are then compared to data received from the target location of the coupon to verify and corroborate all incentive or other redemptive actions which sets forth the details of the sales transaction activity. Information received from the target location could be the specific items purchased and/or the specific amount of inventory available for a given item purchased and/or the previous sales data for a particular product, category of products or a particular unique individual via their unique identifier. The details of the sales and transaction activity are then matched with a Matched Offer to identify an incentive, coupon, offer or other redemptive act which was in fact acted on by the consumer, be it the initial recipient or a subsequent receiver of the coupon. If the subsequent receiver is not within a certain social and or community network, the ability to "join" such network in real time exists through the use of voice phone response and/or electronic sign up process. Similarly, if the subsequent receiver is a "qualified" Incentive/Reward Customer, as was the initial recipient, then the subsequent receiver, can be invited to become such an Incentive/Reward Customer, thereby giving the issuer an additional customer for future advertisements and coupons. Upon a determination that the offer, coupon, incentive or other redemptive act was undertaken the issuer of the card or controller of the method of payment notifies the person who has undertaken the redemption that an appropriate credit has been entered on their card.

In a further aspect of the invention, initiation of the coupon redemption process may be undertaken either by transmittal from an advertiser to a mobile device or by the obtaining by the mobile device user of a coupon or offer which he has seen or is otherwise aware of. By way of example a mobile device or camera may take a picture of a coupon and then transmit that coupon or forward it to a user account to be subsequently used in the retail location identified in the coupon or offer (or even forward it to a member of a social network for their use). The redemption aspects of the invention than permit the coupon to be transmitted to a subsequent recipient within a social network community or to be used by the initial individual. In either event upon redemption of the coupon or offer the issuer of the card or controller of the method of payment matches their customer and the charge activity utilizing the method of payment to match the offer, the data is sent to a database and classified as Matched Offers. The Matched Offers are then compared to data received from the target location of the coupon to determine that all of the incentive or other redemptive acts which set forth the details of the sales transaction activity have been undertaken. The details of the sales transaction activity are then matched with a Matched Offer to identify an incentive, coupon, offer or other redemptive act which was in fact acted on by the consumer, be it the initial recipient or a subsequent receiver of the coupon. Upon a determination that the offer, coupon, incentive or other redemptive act was undertaken the issuer of the card or controller of the method, of payment notifies the person who has undertaken the redemption that an appropriate credit has been entered and, in the event that the person who was undertaken the redemption is a subsequent recipient, the initial recipient may similarly receive up a credit for having participated in the transaction and forwarded the coupon.

Other systems, methods, computer programs and communication structures according to embodiments will be or may become apparent to one with skill in the art upon review of the following drawings and detailed descriptions. It is intended that all such additional systems, methods, computer programs and communication structures be included within this description and within the scope of the present disclosure and be protected by it. The term electronic equipment includes all portable communication equipment. The term portable communication equipment includes all equipment such as mobile telephones, pagers, communicators, electronic organizers, personal digital assistants, smart phones, portable communication apparatus, global positioning system terminals or the like. In the present application, the invention is presently described in the context of a mobile telephone. However it will be appreciated that the invention is not intended to be limited to a mobile telephone and can be used in many types of electronic equipment which are accessible either wirelessly or through hard-wire connections. Similarly audiovisual content may be received by the electronic equipment in any one of a number of matters, such as by podcasts and fixed media coupons. Accordingly, media content in the identification of relevant media content may relate to any mobile media format including but not limited to mobile television mobile radio Internet radio and/or audiovisual channels podcast video clips audio clips audio books animations ring tones commercials advertisements coupons and so forth.

BRIEF DESCRIPTION OF THE DRAWINGS

FIG. 2 is a block diagram of an exemplary offer initiation process illustratively depicting a representative embodiment of certain aspects of the invention.

DETAILED DESCRIPTION OF THE INVENTION

Figure 1:
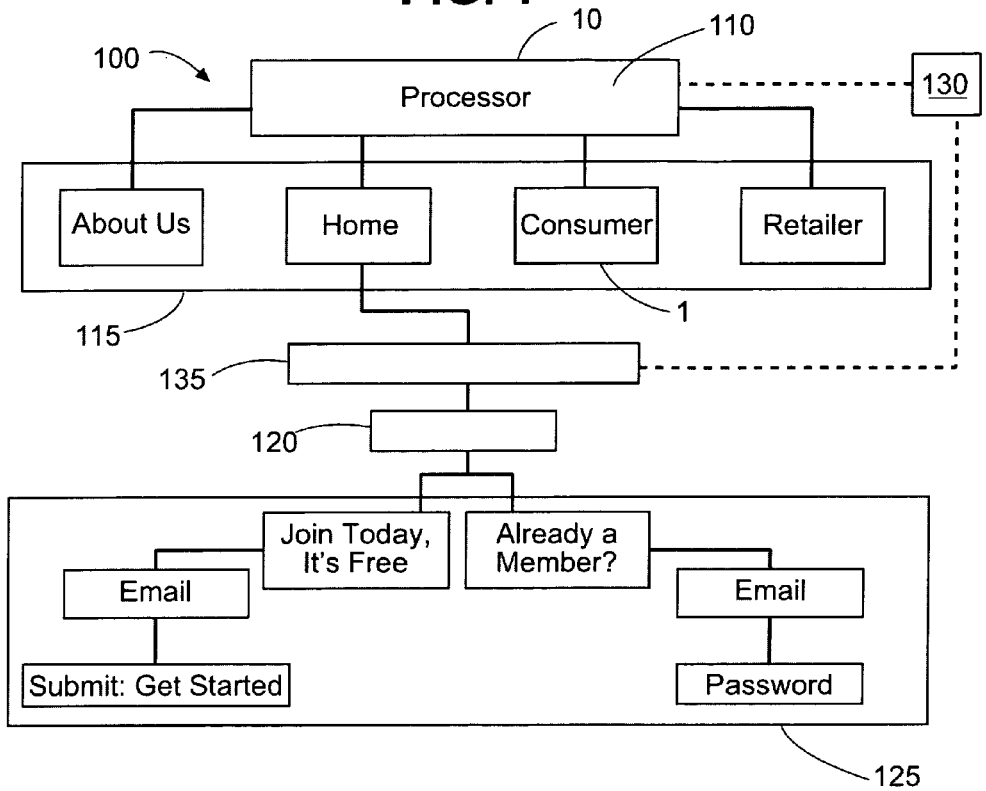
FIG. 1 is a block diagram of an initiation process illustratively depicting one embodiment of an aspect of the invention.

Certain terminology may be used in the following description for convenience only and is not limiting. The words "lower" and "upper" and "top" and "bottom" designate directions only and are used in conjunction with such drawings as may be included to fully describe the invention. The terminology includes the above words specifically mentioned, derivatives thereof and words of similar import.

Where a term is provided in the singular, the inventors also contemplate aspects of the invention described by the plural of that term. As used in this specification and in any claims, the singular forms "a", "an", and "the" include plural references unless the context clearly dictates otherwise, e.g. "a derivative work". Thus, for example, a reference to "a method" includes one or more methods, and/or steps of the type described therein and/or which will become apparent to those persons skilled in the art upon reading this disclosure.

Unless defined otherwise, all technical, legal, copyright related and scientific terms used herein have the same meaning or meanings as commonly understood by one of ordinary skill in the art to which this invention belongs. Although any methods and materials similar or equivalent to those described herein can be used in the practice or testing of the present invention, the preferred methods, constructs and materials are described herein. All publications mentioned herein, whether in the text or by way of numerical designation, are incorporated herein by reference in their entirety. Where there are discrepancies in terms and definitions used by reference, the terms used in this application shall have the definitions given herein.

The term "variation" of an invention includes any embodiment of the invention, unless expressly specified otherwise.

A reference to "another embodiment" in describing an embodiment does not necessarily imply that the referenced embodiment is mutually exclusive with another embodiment (e.g., an embodiment described before the referenced embodiment), unless expressly specified otherwise.

The terms "include", "includes", "including", "comprising" and variations thereof mean "including but not limited to", unless expressly specified otherwise.

The term "consisting of" and variations thereof includes "including and limited to", unless expressly specified otherwise.

The terms "a", "an" and "the" mean "one or more", unless expressly specified otherwise. The term "plurality" means "two or more", unless expressly specified otherwise.

The term "herein" means "in this patent application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The terms "such as", and/or "e.g." and like terms means "for example", and thus does not limit the term or phase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like. It does not imply certainty or absolute precision, and does not imply that mathematical processing, numerical methods or an algorithm process be used. Therefore "determining" can include estimating, predicting, guessing and the like.

It will be readily apparent to one of ordinary skill in the art that the various processes described herein may be implemented by, e.g., appropriately programmed general purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 10 may be provided by a single shared processor or multiple processors. Use of the term "processor" should not be construed to refer exclusively to hardware capable of executing software. Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

A "processor" includes one or more microprocessors, central processing units (CPUs), computing devices, microcontrollers, digital signal processors, or like devices or any combination thereof. Thus a description of a process is likewise a description of an apparatus for performing the process. The apparatus can include, e.g., a processor and those input devices and output devices that are appropriate to perform the method. Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" includes any medium that participates in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Among the various components and entities which may be a part of the electronic coupon generation, redemption and processing system which is communicating with a financial communications network the following entities may be advantageously employed:

A. Consumer Aggregator: a consumer aggregator may be an organization which may be on the issuing side of the financial communications network and payment environment and which may have registered consumers, reward members or other individuals to whom it may send advertisements and coupons.

B. Reward Member: a reward member may be a consumer who may be the end or one who is otherwise associated with a consumer who may be registered with the consumer aggregator. The reward member may expect to receive a credit, reward, or other benefit for undertaking the activity which is being pushed to them including the making of a purchase using various payment cards which the reward member may have registered with the consumer aggregator. A reward member may have registered one or more cards, including credit card, reward cards or other forms of identification indicia that are part of a financial network, with the consumer aggregator. The terms "reward member", "customer", "cardholder" and/or "consumer" may be used interchangeably, along with other variants which indicate a similar position within the incentive structure and system. A card may be, but does not necessarily have to be a Visa®/Master Card®/American Express® card or other form of financial identifier, including PayPals® etc. and others and may be co-branded with the consumer aggregator as well as with an issuing bank or entity, which is one that is capable of participating within the electronic fund transfer system of the financial network.

C. Acquiring Processor: an acquiring processor may be an entity that may accept payments on transactions from merchants and other participating entities and may be involved in and otherwise accommodate and handle some or all of the management of the financial transaction, and particularly the payment aspects thereof, including the electronic transfer of funds associated with the transactions. This may include but is not necessarily limited to the payment of funds or electronic or other transfer of funds to the merchants, the providing of a coupon or reward benefit to the reward member and the providing of such incentive payments to the mobile coupon processor and such other entities is maybe involved in the financial network associated with the transaction and process.

D. Mobile Coupon Processor: a mobile coupon processor (which may also be referred to as a coupon or incentive processing entity along with other variants which indicate a similar position and activity within the incentive structure and system) may be an entity which may provide some or all of the coupon transaction functions and made manage or otherwise provide some or all of the aspects of registering, selling, marketing, supporting and processing of the data for the reward members and coupons. The mobile coupon processor may also deliver and further process the coupons including dissemination of those coupons within a social network and obtaining of information from that dissemination in order to target reward members and others with coupons and rewards. A mobile coupon processor may also be a part of an entity which may or may not be a part of the financial network associated with transaction processing.

As a preliminary in the initiation of an incentive reward system which may be implemented, and as an example only of one aspect of the system, a credit card or similar financial network entity which may serve to verify and authenticate a charge, may send to its current and/or potential new card user's information concerning the incentive reward system ("Customer Sign-Up"). This may also be sent by a consumer aggregator or other entity which has direct or indirect communication and contact (via SMS or other known or future communication vehicles) with an Incentive/Reward Customer 1. For purposes of description only, the entity or entities may also be cumulatively referred to as the "Incentive System Initiator" 1000. The information may include particulars as to the Incentive/Reward Customer's cash back, real-time rewards, what the Incentive/Reward Customer 1 wants done with the reward (donation, delivery to a credit/debit card, receipt of a reward card, etc.) and social network information (Twitter®, LinkedIn® and Facebook®, by way of example). This may be afforded in a retail environment without specific reference to or possible modification of the point-of-sale or infrastructure of that retail environment. The Incentive/Reward Member 1 may be requested to opt in to the system so that they may be contacted. Once that occurs either a new card may be sent to a new card user or a current card user's account may be flagged so as to indicate that they are both part of the incentive reward program. The information relating to the new card user or current card user may be forwarded to the coupon processing entity 10 which may have responsibility for the incentive reward system. The coupon processing entity 10 may be part of or separate from other entities within the financial network.

Figure 1B:
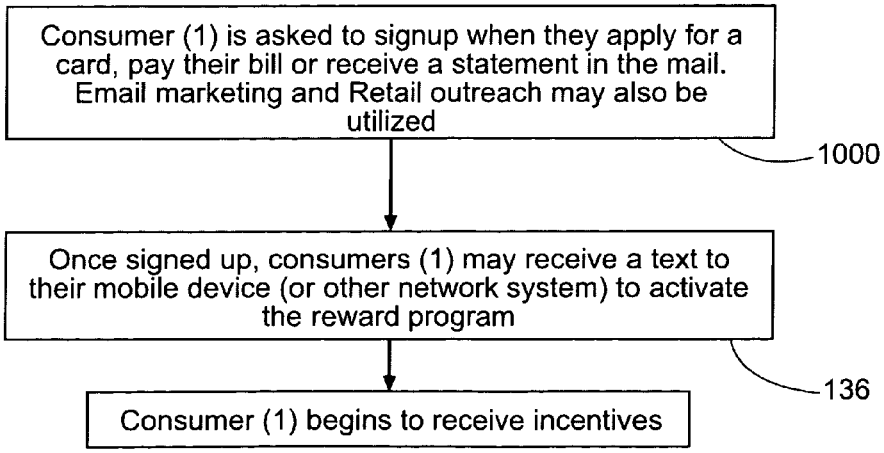
FIG. 1B is a block diagram of a activation process illustratively depicting one embodiment of an aspect of the invention.
Figure 1A:
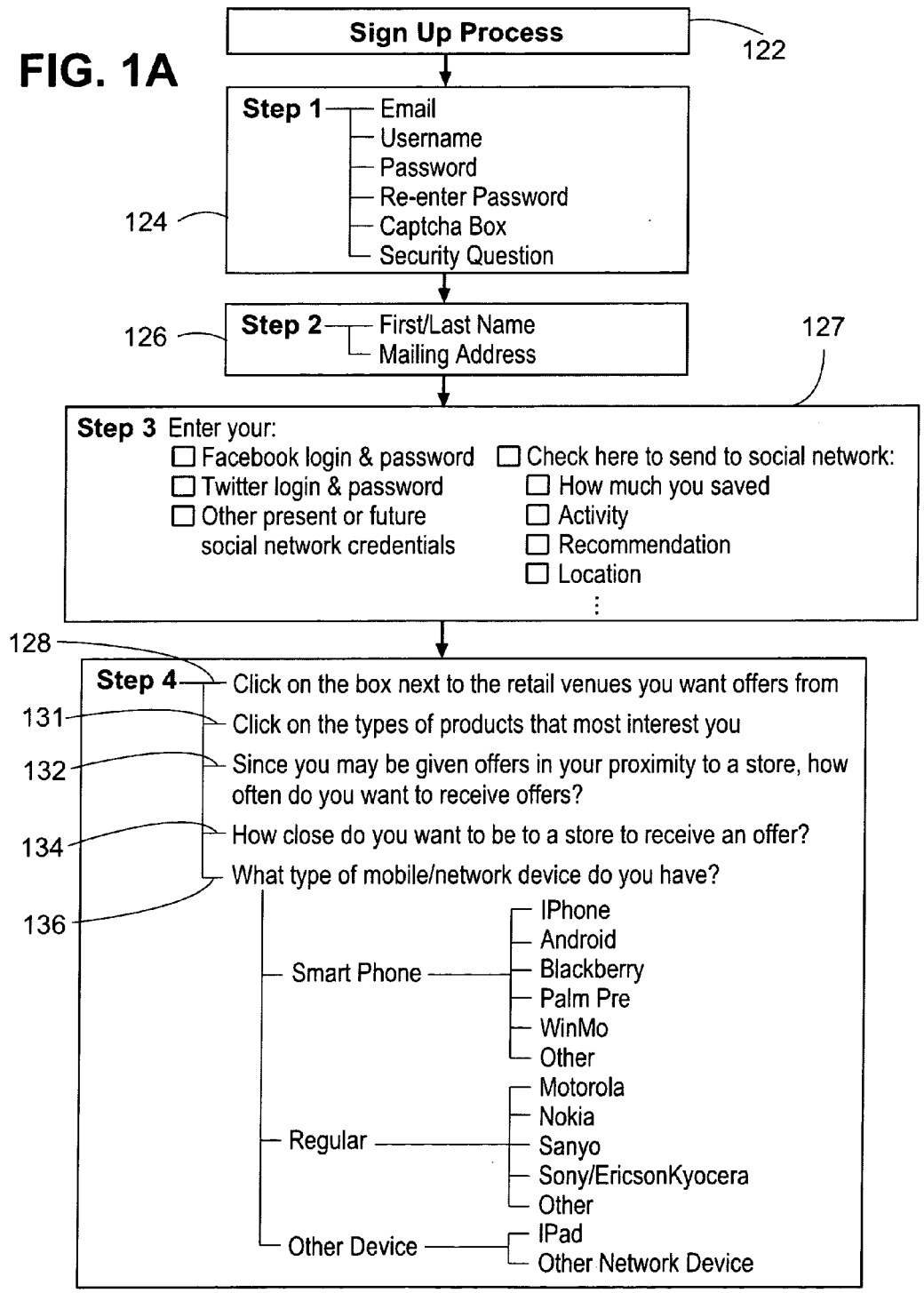
FIG. 1A is a block diagram of an exemplary sign up process illustratively depicting one embodiment of an aspect of the invention.
Figure 3:
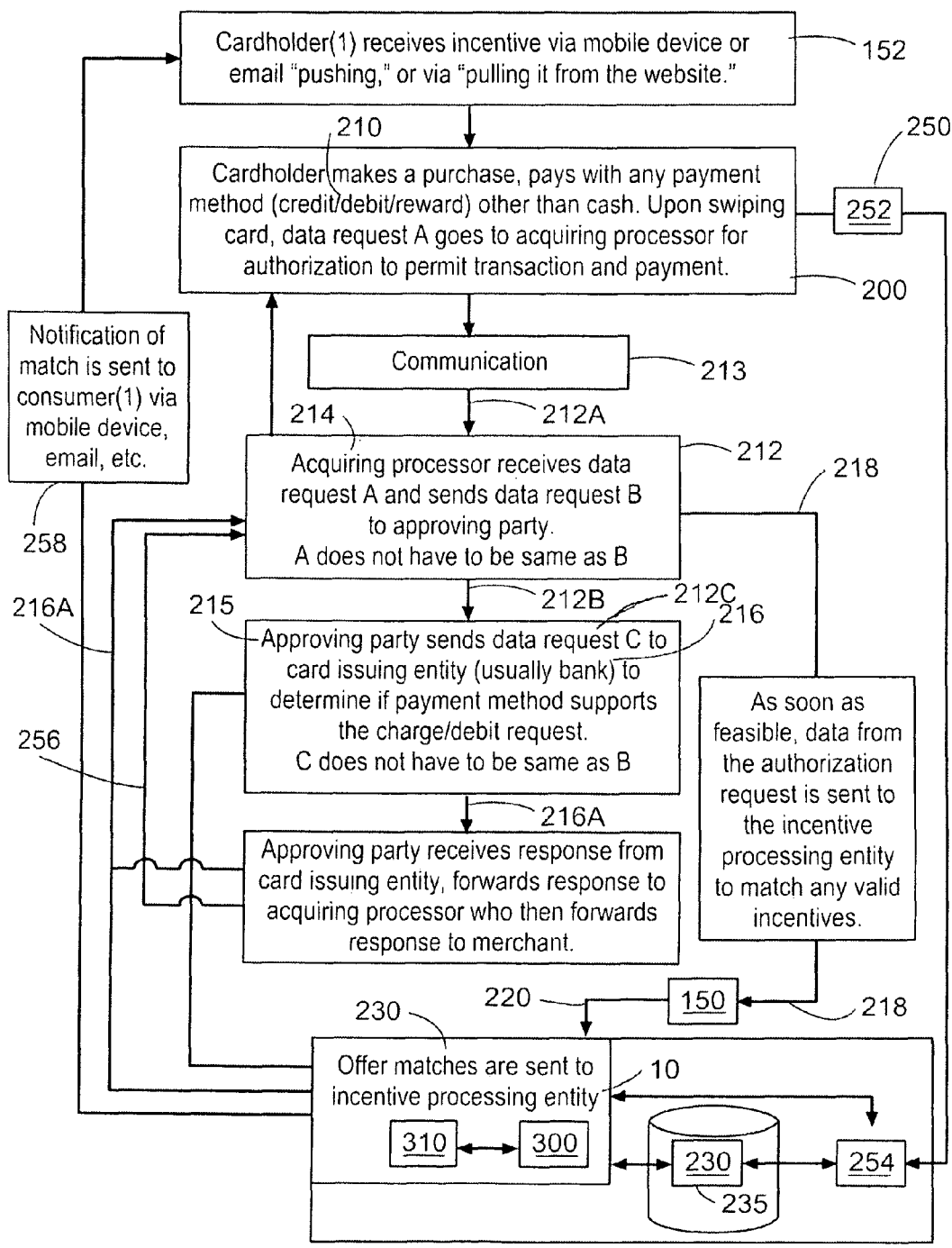
FIG. 3 is a block diagram of an exemplary authorization process illustratively depicting a representative embodiment of certain aspects of the invention.

Referring to FIG. 1, FIG. 1A and FIG. 1B there are illustrated, by block diagrams, an exemplary machine system architecture 100 for initiating an incentive reward consistent and in accordance with one aspect of the present invention. The system architecture 100 may include a processor 110, a storage device 115, and a communications module 120, which permits the processor 110 to communicate with Incentive/Reward Members 1 or potential Incentive/Reward Members 1 who seek to opt into the incentive reward system. The machine architecture 100 may also include input devices 125 and output devices 130 as well as a network and/or system bus 135 to facilitate communication between and among the various elements of the system architecture 100 and other elements associated therewith.

Upon receipt of a confirmation from the Incentive System Initiator 1000, or similar entity, that a user has opted into the incentive reward system 100, the coupon processing entity may contact the reward customer 1 via a text message or other form of communication and may request that they activate their account in order to be eligible for an incentive reward. By way of example, the reward customer 1 may be contacted via a computing device communicating over an electronic network (not shown) or may be contacted via a mobile communication device. The reward customer 1 is invited to activate the sign-up process as is shown in an exemplary fashion in FIG. 1A and FIG. 1B.

Referring to FIG. 1A, there is shown an exemplary sign up process 122 in which a first step 124 may request of the reward customer 1 a user name, password and security information in order to permit the setting up of an appropriate account 126. Upon completion of the first step 124, and the creation of the account 126, the reward customer 1 may be requested to provide information as the social networks 127 which they participate in and whether they wish to have their purchasing and reward activities relayed or posted to those networks or to particular groups or individuals within those social networks. The incentive/reward member 1 may also be asked as to the types of retail venues 128 which the reward customer 1 desires, the types of products 131 that most interest the reward customer 1 and other information such as how often the reward customer 1 wishes to receive offers 132 and in what proximity to a particular store the reward customer 1 wishes to be prior to receiving the offers 134. The above information requests are merely exemplary in order to permit the reward customer 1 to obtain relevant and targeted incentives which will thus enhance the experience for him. The reward customer 1 may also be asked to detail the particular type of communication system 136 upon which they wish to receive the information, including smart phones, regular phones and related mobile devices such as global positioning systems ("GPS") which may be employed in conjunction with car navigation systems, or on stationary devices or other network related devices now available or which may become available in the future.

FIG. 2 illustrates one preferred embodiment of an exemplary initiation of the incentive process and system architecture 100 by receipt of an offer to a reward customer 1. The reward customer 1 may allow their mobile communication device 140 having a display module 142, to be visible in relation to store locations or other indicia which the reward customer 1 has provided or which the coupon processing entity 10 believes may be applicable to the reward customer 1. When the reward customer 1 is within the predetermined proximity of the store offering an incentive which comports with the desired offering incentive criteria, an ad/coupon server 150 activates an offer 152, which is sent to the reward customer's 1 desired mobile device. By way of example the offer may provide: "Come to the Borders store on Main Street, spend $100 using your Chase card ending in 1234 and get $10 back rewards credited to your credit card statement." In such an exemplary instance the verification issuer would have been Chase. The offer 152 is shown on the display module 142.

The offer 152 which is shown on the display module 142 may be any one of a number of varieties. For example, the ad/coupon server 150 may produce an electronic coupon or incentive which contains information including data which indicates the electronic coupon serial number, identification number, data representative of validation or authentication keys which may be employed with the coupon, data representative of the vendor that authorized the coupon and that will redeem the coupon, data representative of the entity that issued the coupon and data representative of the particulars of the coupon itself. Alternatively, the ad/coupon server 150 may produce an electronic coupon which contains, selected information solely related to the offer. The electronic coupon does not need to carry identification information in as much as it is uniquely transmitted to the reward customer 1 who will have other identifying information associated with the their credit card (or other identifier) which will permit or assist in independent verification and/or redemption Alternatively, an reward customer 1 can specifically request that the ad/coupon server 150 search for and produce an electronic coupon 152 which relates to a store or similar retail establishment which the reward customer 1 is currently in or anticipates going to. In such an instance, the processor 110 accepts the request from the reward customer 1, the ad/coupon server 150 searches its database in storage device 180 for a retailer or store which fits the criteria and transmits a relevant electronic coupon 152 to the reward customer 1.

Referring to FIG. 3 through FIG. 10, there is generally shown a series of illustrative high-level flow diagrams, with illustrative system implementation, by which a reward customer 1 may receive an offer 152 and effectuate the offer process via the system architecture 100. An example of this flow involves a reward customer 1 who has received an incentive offer 152 to shop at a particular retail establishment 200 or to undertake some other redemptive activity. The reward customer 1 goes to the particular retail establishment 200 or other entity in which the activity is to be undertaken, undertakes to purchase the required amount (or accomplish the redemptive action) pursuant to the incentive offer 152 and presents a card 210 to a merchant 206 at the retail establishment 200. The retail establishment 200 swipes or otherwise seeks authorization to permit the use of the card 210. An authorization data request 212A may generally be transmitted via data bus 213 in this exemplary fashion through to an acquiring entity 214 at a location 212 other than the point-of-sale, which then may send a data request 212B to an approving party 215. The approving party 215 may then send a data request 212C to a card issuing entity 216 to request, illustratively, information as to whether the payment method supports the charge/debit/payment request. The approving entity 215, typically Visa®/MasterCard®/American Express®/PayPals®, etc. may process the authorization request 212B and forward it to the card issuing entity 216. The card issuing entity 216 may enter and process the credit data and transaction against the reward customer 1 credit/debit/reward file and, upon approval, may forward a response 216A to the approving entity data query 212C to permit the retail establishment 200 to complete the transaction. The card issuing entity 216 and/or the approving entity 215 may be a third party unrelated to either Visa®/MasterCard®, etc., such as a private network such as PayPal® (www.paypal.com), or may be a sovereign entity, national bank, etc.

The acquiring entity 214 may also process and transmit a data query 218 to the ad/coupon server 150 or to a related database, server or processor, which may contain data concerning ads and/or coupons. The data query 218 may be processed and matched to the advertisements and offers in the ad/coupon server 150. In the event that there is a match, a data confirmation 220 may be sent to a processor 300, which may operate in conjunction with a storage device 310, all of which, illustratively, may be maintained by the incentive processing entity 10, or may be maintained by another entity within or without the financial network. The data confirmation 220 may contain those offers which are matched to redemptions (matched offers 230). The matched offers 230 may be stored in a storage device 235 for further processing, retention and/or transmission.

The retail establishment 200 which has made the particular sale which is the subject of the redemption may, either simultaneously with effectuating the authorization or at a subsequent time, preferably on the same day, transmit a sales log 250 containing redemption information 252 to the incentive processing entity 10. The redemption information 252 may then be processed and matched against the matched offers 230. In the event that there is a determination by a processor 254 that the redemption information 252 and the matched offers 230 coincide, a notification may be sent to acquiring entity 214 and the card issuing entity 216 to, illustratively, include a redemption amount 256 as a credit on the reward member's 1 credit/debit/reward card 210. The incentive processing entity 10 may also notify members of the reward member's 1 social network of the activities that the reward member is performing and the benefits received. The incentive processing entity 10 may also, by way of illustration, distribute the incentive to third parties or to a virtual wallet for the reward member 1, pursuant to the reward member's desires and instructions.

It will be appreciated that in the above described exemplary embodiment, the authorization and redemption as well as the providing of the actual incentive to the reward member 1 may employ available data, processors and/or storage and may not require the addition of point-of-sale devices other than those which are currently employed by retailers. It will be further appreciated that, by the use of the exemplary embodiment and related embodiments which will be evident to those skilled in the art, the retail establishment may no longer be actively involved in the actual processing or redemption or otherwise issuing of credits, which may be undertaken, in whole or in part, via system 100 through the incentive processing entity 10 or in conjunction with other parties within the financial network, thereby removing the retailer from the actual redemption benefit process. It can also be appreciated that the acquiring entity 214 and the card issuing entity 216 may be related or may be the same entity. Similarly, various processes, actions and systems may be deployed and operated by various members within or without the financial network, all of which is within the scope and disclosure of this invention.

The embodiments discussed above are merely illustrative and to the extent that the embodiments are described in conjunction with or by reference to illustrations, various modifications and adaptations of those methods and specific structures may become evident and apparent to those skilled in the art. By way of example various components and functions may be comprised of instructions that form part of or are stored in mobile communication devices or on computer readable storage media. Instructions may comprise software, firmware and program code and may be retrieved and executed by a processor. Similarly, the exemplary embodiments are not limited to the methodology by which a reward member 1 receives the particular incentive. It may either be as a result of a specific request by the reward member 1, a general request to be notified of such incentives, or general criteria by which the reward member 1 has indicated a willingness to accept coupons or similar incentives.

Figure 4:
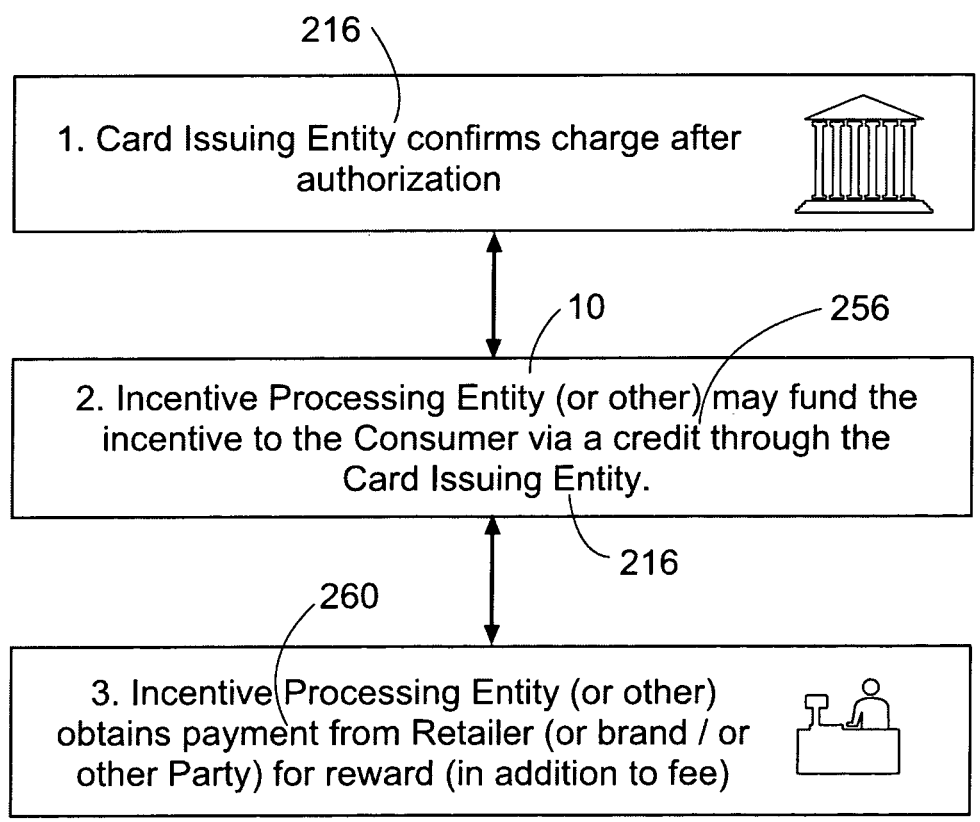
FIG. 4 is a block diagram of an exemplary redemption and settlement process illustratively depicting a representative embodiment of certain aspects of the invention.
Figure 5:
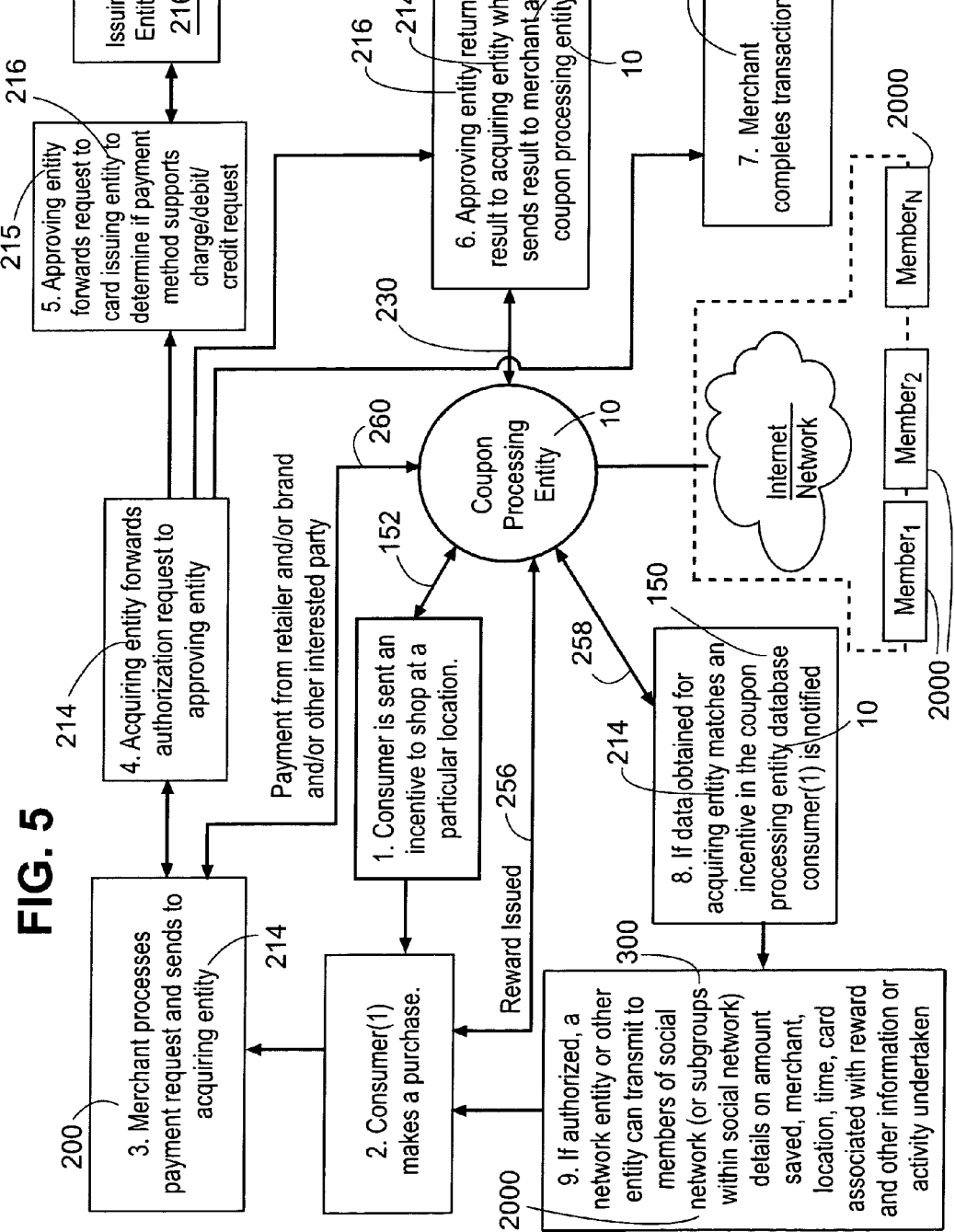
FIG. 5 is an exemplary flow diagram of a representative process flow illustratively depicting a representative embodiment of an aspect of the invention.
Figure 6:
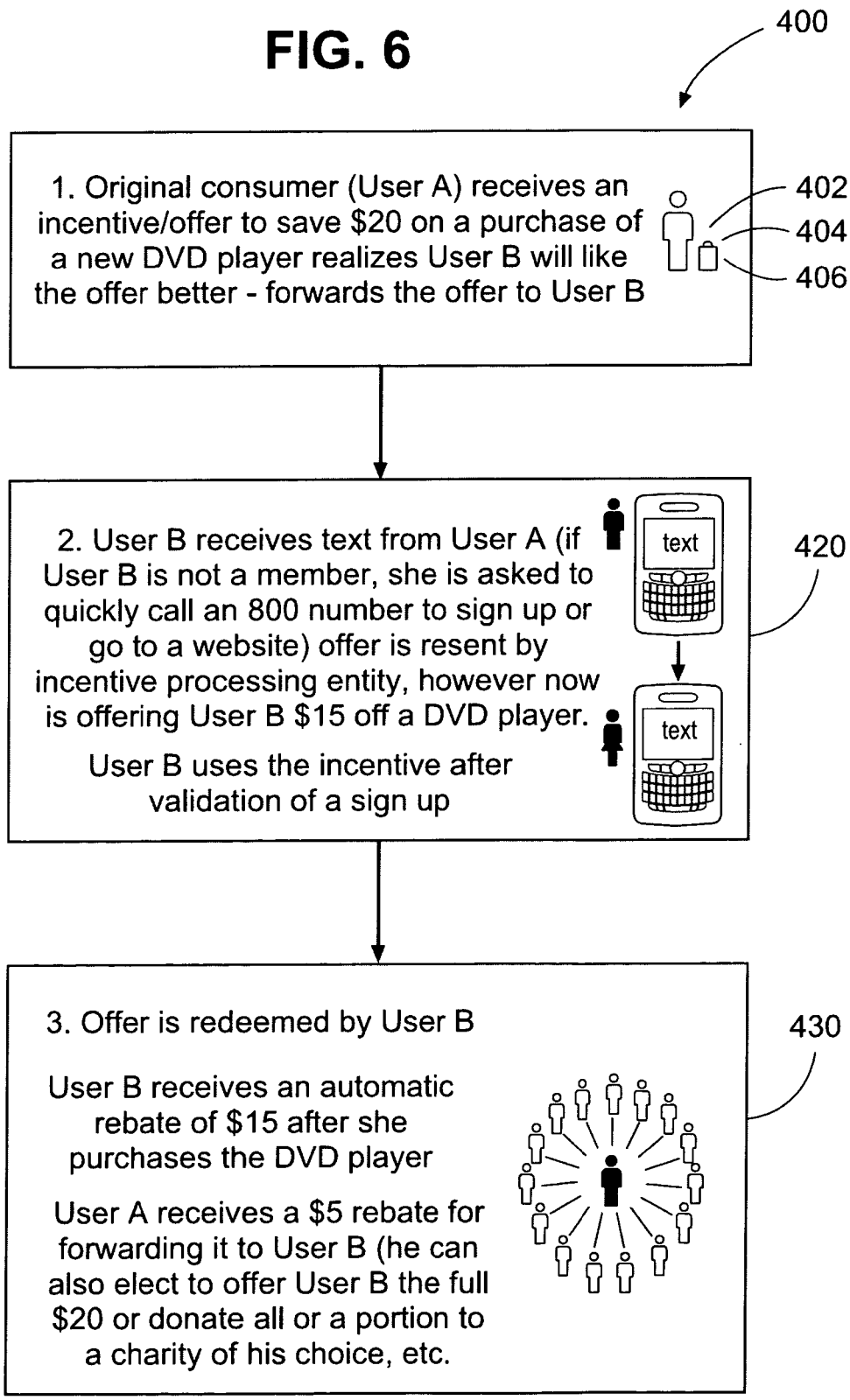
FIG. 6 is a block diagram of a representation of certain viral aspects of a representative embodiment of an illustrative aspect of the invention and the incentive process.

FIG. 4 shows a further aspect of the invention in which the card issuing entity 216 within the financial network confirms the charge after authorization. Confirmation of the charge and the concomitant authorization is forwarded to the incentive processing entity 10. Processor 254 may process the information against the coupon information in one or more storage devices 150. In the event that the charge and the coupon information are matched the incentive processing entity 10 may fund the coupon or reward amount via a financial credit 256 through the card issuing entity 216. The financial credit 256 may be forwarded through the authorization stream generated by the sale or other financial activity undertaken by the reward member 1. The incentive processing entity 10 may obtain payment 260 from the retailer 200 or such other party as has sponsored the coupon/incentive and may provide substantially immediate notification to the reward member 1, preferably while he is still at the checkout. The notification 258 may be provided to the reward member 1's 1 mobile device and may simultaneously be sent to other user designated device(s) to permit storage or processing. It can also be seen from FIG. 4 and FIG. 5 that the reward member 1 may also opt to obtain a direct credit and, if the entity sponsoring the coupon so chooses, obtain a reward card or similar indicia of the reward which may be redeemed at a later date.

Figure 7:
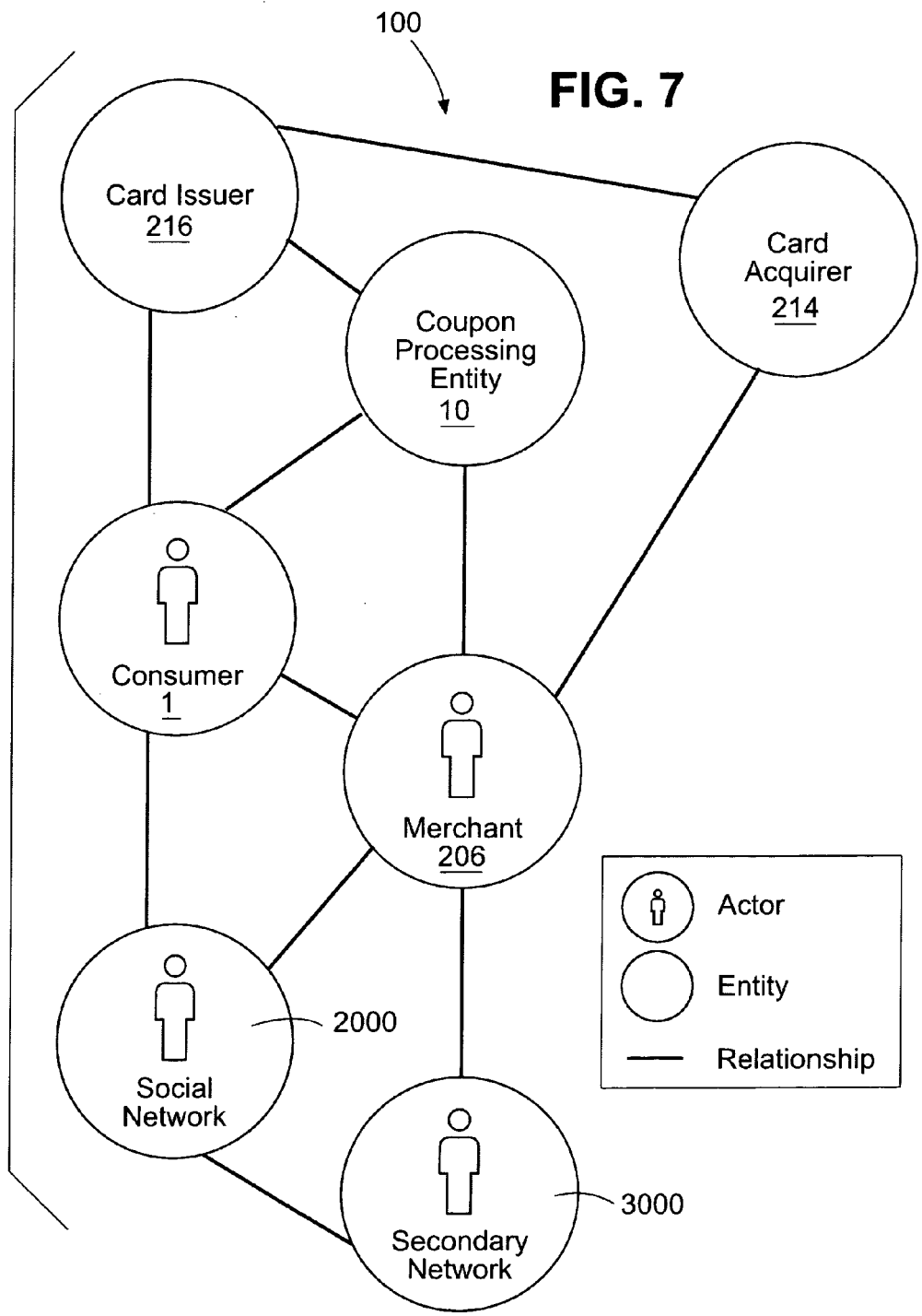
FIG. 7 is a high level relationship diagram exemplifying certain of the parties and entities which illustratively may or can interact within the system.

As can best be seen in FIG. 1 and FIG. 2, taken in conjunction with FIG. 7, a reward member 1 can initiate and gain access to the coupon processing system in a variety of ways. The reward member 1 can contact his bank or other issuing entity and request that they become a part of the coupon processing system 100. Alternatively a reward member 1 can access the system 100 through a global communication network, a localized communication network or, ideally, via the Internet. The reward member 1 may indicate preferences as to the type of coupons and other benefits which they wish to receive and those preferences may be stored and may become a part of both the reward member 1 profile and a redemption database for establishing and adapting the process specifications by which incentives and rewards are transmitted to reward members in general and to the particular reward member 1. A reward member 1 can either request currently available coupons or can request that they be notified of such coupons when and as they become available. Once the coupon processing entity 10 determines that a reward member 1 preference exists it can send either directly or through a third-party the incentive in accordance with the reward member 1 preference. The presentation of the incentive may be done in any one of a number of ways. For example simple text may be employed to advise the reward member 1 that a particular incentive is available through a particular merchant and indicate the closest location of that merchant to the reward member 1. Alternatively a reward member 1 can pull advertisements with associated coupons that match the incentive system and then opt to engage in the activity and obtain the benefit of the coupon. A reward member 1 could do this via a mobile or desktop device or any other device through an associated network and/or the Internet. The processor and adaptive process specifications may also permit a dual-mode of operation where pushed data and pulled data are dynamically used to generate coupons and offers.

Returning again to FIG. 5, once the reward member 1 makes the purchase which is associated with the incentive and the merchant 200 swipes the card associated with the reward member 1 and the incentive, the information is forwarded to the acquiring entity 214. The reward member 1 and the merchant 200 at the point-of-sale do not need to engage in any other activity at that time to enable or otherwise process the incentive. As is seen illustratively in Step 6, the acquiring entity 214 queries the database of coupons 150 (either directly or through the incentive processing entity 10) to determine whether the reward member 1 was sent a coupon or reward which matches the coding and the other criteria for redemption. It can be appreciated that the coupon processing entity 10, although shown to the any separate entity from the card issuing entity 216 could in fact be a part of that entity or a part of another entity within the financial network. The card issuing entity 216 continues to process the transaction to permit the merchant 200 to complete the transaction. If the database query is matched, the reward member 1 may be sent a notification that they will receive a credit/award/reward or that the incentive will be apportioned or delivered as direct by the reward member 1. As is evident from the transaction there is little or no need to train point-of-sale personnel or to modify or change the point-of-sale system. The discount or benefit can be sent directly to the reward member's 1 credit card or the reward member 1 can opt to have it delivered in alternate ways such as retaining part of it in a virtual wallet, obtaining a reward or benefit card from the retailer or otherwise receiving the discount or benefit in some other flexible and reward member 1 determined fashion. The reward member 1 may also have activity displayed on a social network community or site and may have such parts of the activity displayed to some or all of the members 2000 within that social network community. For example, the reward member 1 may have certain members know that the reward member is at a specific retailer 200, has purchased a particular item and has received a reward. They can have sufficient information of the activity to permit other social network members to opt (pull) to obtain similar benefits or can opt to have the incentive processing entity 10 deliver (push) similar benefits to other members (or both).

The embodiments discussed above are generally depicted in relationship to the receipt by an individual of an incentive. However they are not limited thereto. By way of further example FIG. 6 the reward member 1 may obtain a particular incentive and elect to either use it himself or propagate it through a social network 400. Such social networks 400 may include schools 402, workplaces 404, or social environments 406 which are created by members who have similar qualities, characteristics and who otherwise choose to be associated with one another. By engaging a particular social network 400, the reward member 1 may decide to forward a particular incentive to another member 420 within that particular social network 400 or to a secondary social network 3000 (See. FIG. 7). When the other member of the particular social network 400 receives the incentive forwarded by the reward member 1, there will generally be a higher degree of confidence about the particular incentive and the underlying product or service which is meant to incentivize, in as much as it will have received the imprimatur of the original reward member 1.

When the other member 420 within that particular social network 400 receives the particular incentive and decides to undertake the redemptive activity required by the incentive, the redemption flow will continue up to the point at which the issuing party 216 queries the database to determine whether this is a matched offer 230. In the event that the other member 420 is not a reward member, the issuing bank can forwarded to the other member 420 a congratulatory announcement permitting them to join the reward member 1 group. Immediately upon acceptance, the offer will become a matched offer 230 and will be processed by applying a credit to the other member 420 credit card. The issuing party 216 may set up a subaccount internally such that in the future the other member 420 will be eligible to receive directly incentives in the same manner as which the original reward member 1 has received them.

In a further embodiment an advertiser 500 or entity which is issuing the coupon or redemptive cookie may elect to further promote and incentivize the original reward member 1 to take action based upon the coupon or redemptive cookie. By way of example the advertiser or entity could, provide to the original reward member 1 a redemptive benefit 430 either by way of, merchandise or cash credit in the event that the other member 420 undertakes to redeem the coupon or take the redemptive activity called for.

As a further embodiment and benefit to the advertiser 500, the particular rewards which are redeemed by the individuals may be monitored either by the advertisers or directly by the issuing party in order to permit the advertiser 500 to further refine and target the reward member 1 and those individuals to whom the reward member 1 has forwarded the coupons. This information may be stored on a server system to provide the "accept or reject" information to the advertisers 500.

Figure 8:
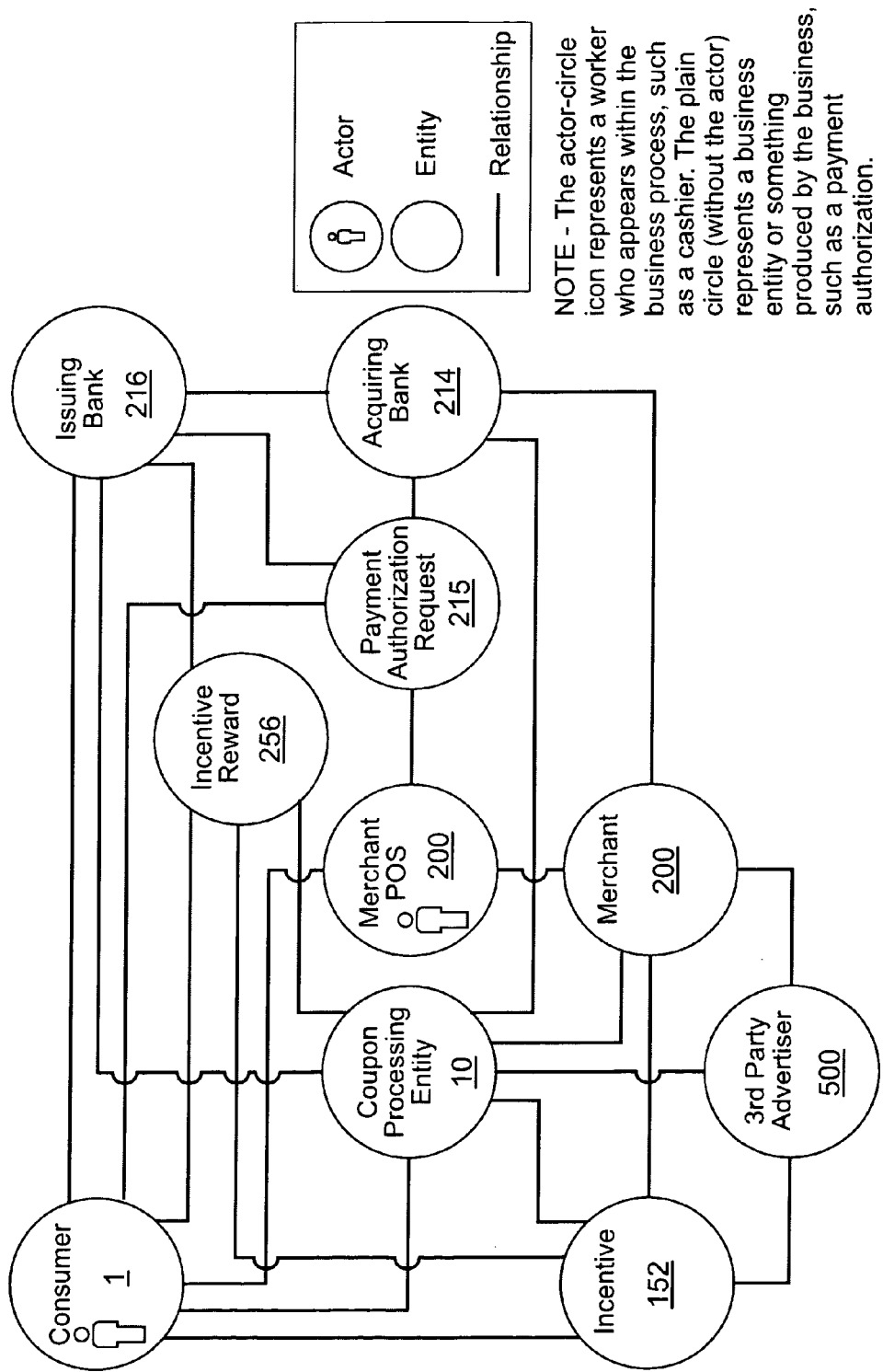
FIG. 8 is a flow diagram of an exemplary system for performing the incentive and redemption operation consistent with one illustrative embodiment of the present invention.

Referring to FIG. 8, by way of illustration, one aspect of the invention may permit the retailer 200 and/or advertiser 500 to change the coupon and promotion "on-the-fly", thus permitting it to be modified in relationship to the desired anticipated response or other criteria. Thus, for example, the retailer 200 or the advertiser 500 may have decided to commit $500,000 to a campaign. The retailer 200 or advertiser 500 may direct that the coupon processing entity 10 issue only 10% of the coupons during the first week of the campaign and then monitor redemptions to determine the redemption rate and the spend amount. If the redemption rate is too high, the retailer 200 or the advertiser 500 may reduce the number of coupons which go out the next week, or increase the amount of the redemptive purchase needed to secure the coupon benefit.

These are only examples of activities which may be undertaken. Similarly, the initiative sponsoring entities are not limited to retailers or advertisers and include any entity or individual who may offer an incentive for undertaking an activity (eg. Surveying entities, schools, not-for-profits, etc).

A further aspect of the invention may permit the retailer 200 and/or the advertiser 500 to conduct site specific and product specific promotions based upon SKU and other identifier information. Thus, a retailer 200 can provide a $10 coupon at locations in Chicago and $15 in New York for the same merchandise or on the same campaign. Alternatively, the retailer 200 can determine that its inventory of a certain product in one location is too high and can do a promotion based upon SKU data and inventory information to dynamically control its coupon and advertising campaigns.

Although the particular embodiments have generally referred to the provision of cash or credit to either the reward member 1 or the other member 420, such incentives can also be provided by way of rewards through frequent-flier miles, PayPal services, related discounts on other products, and other incentivizing means.

As another embodiment of the invention and to further benefit the advertiser 500, retailer 200, or card issuer 216, among others, when an reward member 1 has a credit, debit, prepaid card or card that one can pre-load with funds (issued by a bank or entity where one deposits money), a chip or information on the swipe strip which may be placed on cards of all those who opt into the coupon/incentive system 100. The chip or swipe strip detects the coupon, confirms that the redemption has taken place per the redemption requirements, and then, once the authorization is acknowledged, it credits the card with the coupon amount. In such a situation, the redemption will be automatic and can be employed both with retailers that are using a single card to clear their transactions and in those instances where a random card is used at a retailer that has a promotion which is being run through another credit card issuer whose card is being used with the retailer.

Coupons and rewards, such as those used in the exemplary systems described above with reference to FIGS. 1 through 10, or any other system, may have various intrinsic features and may be specified by an application and/or an advertiser. Coupon features may include one or more of the following: text, a link, an audio file, a video file, an image file, executable code, embedded information, etc.

When a coupon is served, certain parameters may be used to describe how, when, and/or where it should be served and the individual or individuals to whom it should be served. Looking at FIG. 11, certain illustrative parameters are set forth. These parameters are often referred to as "serving parameters". Serving parameters may include a search query or search results, a user characteristic (e.g., choices made by the user, their geolocation, previous behavior, participation in groups, etc.), a host or affiliate site (e.g., America Online®, Google®, Yahoo®, etc.), types of other coupons served, when during the day it is to be served, the number of days it is to be served, etc. There are numerous other serving parameters that may be used in the context of the invention and the above are merely illustrative.

Serving parameters may be either extrinsic, associated with a coupon or both and may act as serving conditions or constraints. A retailer 200 or brand may target the serving of its coupon by specifying that it is only to be served on weekdays, only to users in a certain geolocation, having a card issued by a specific party, etc. The service parameters may also be altered on the fly. Thus, a retailer or coupon promoter can make an initial determination that an aggregate dollar amount of coupons and concomitant benefits are the goal of their campaign. The coupon promoter can commence the campaign and issue a percentage of the total campaign value on the first day. The coupon promoter can monitor the redemption on a daily or weekly basis and determine the redemption rate and amount of the dollars which have been expended. The coupon promoter Ken stop the campaign before all of the coupons are sent out or can modify the campaign by increasing or decreasing the amount of the reward and the other constraints and redemption features prior to the issuance of the next percentage of the campaign value.

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Coupon spots in the document may be defined by embedded information or instructions. In the context of the Internet, a common document is a Web page. Web pages often include content and may include embedded information (such as meta information, hyperlinks, etc.) and/or embedded instructions (such as Javascript, etc.). In many cases, a document has a unique, addressable, storage location and can therefore be uniquely identified by this addressable location. A universal resource locator (URL) is a unique address used to access information on the Internet.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer or Netscape), a media player (e.g., an MP3 player, a RealNetworks streaming audio file player, etc.), a viewer (e.g., an Adobe Acrobat pdf reader), etc.

"User information" may include user behavior information and/or user profile information. It may also include a user's geolocation, or an estimation of the user's geolocation.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

Figure 9:
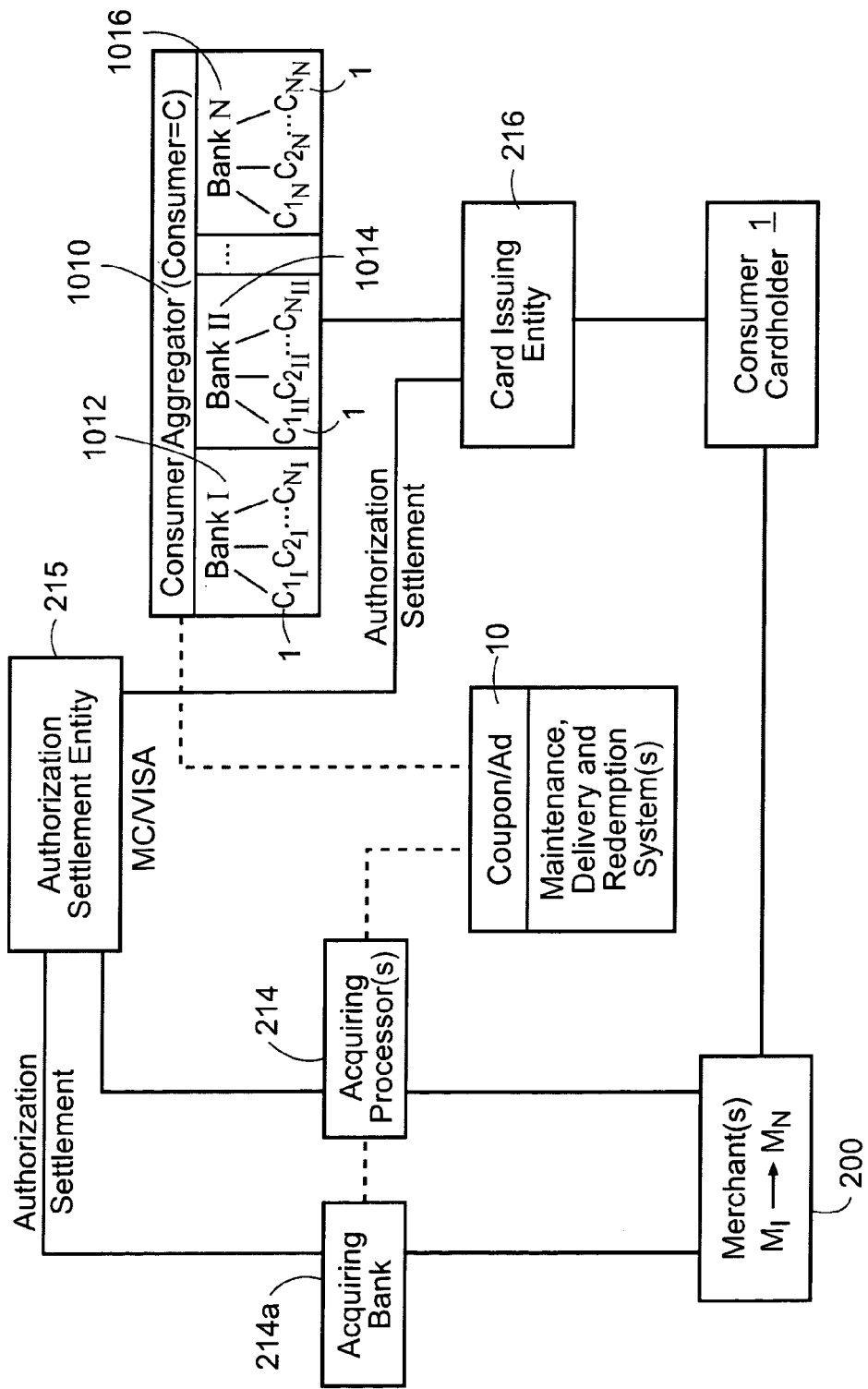
FIG. 9 is a block diagram of an exemplary system for performing the various operations in a manner consistent with one illustrative aspect of the present invention.
Figure 10:
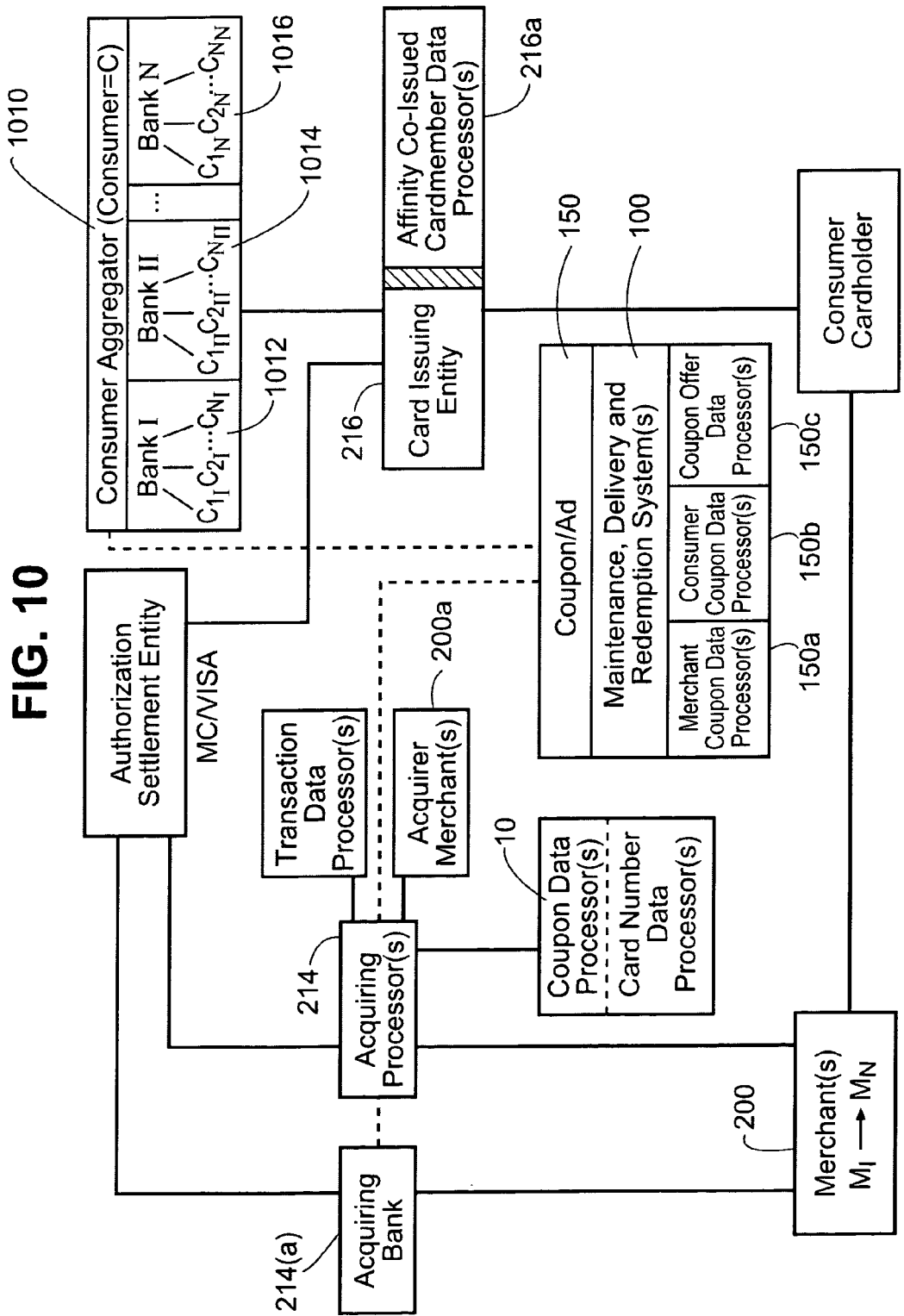
FIG. 10 is a block diagram of an exemplary system for performing the various operations in a manner consistent with one illustrative aspect of the present invention.
Figure 11:
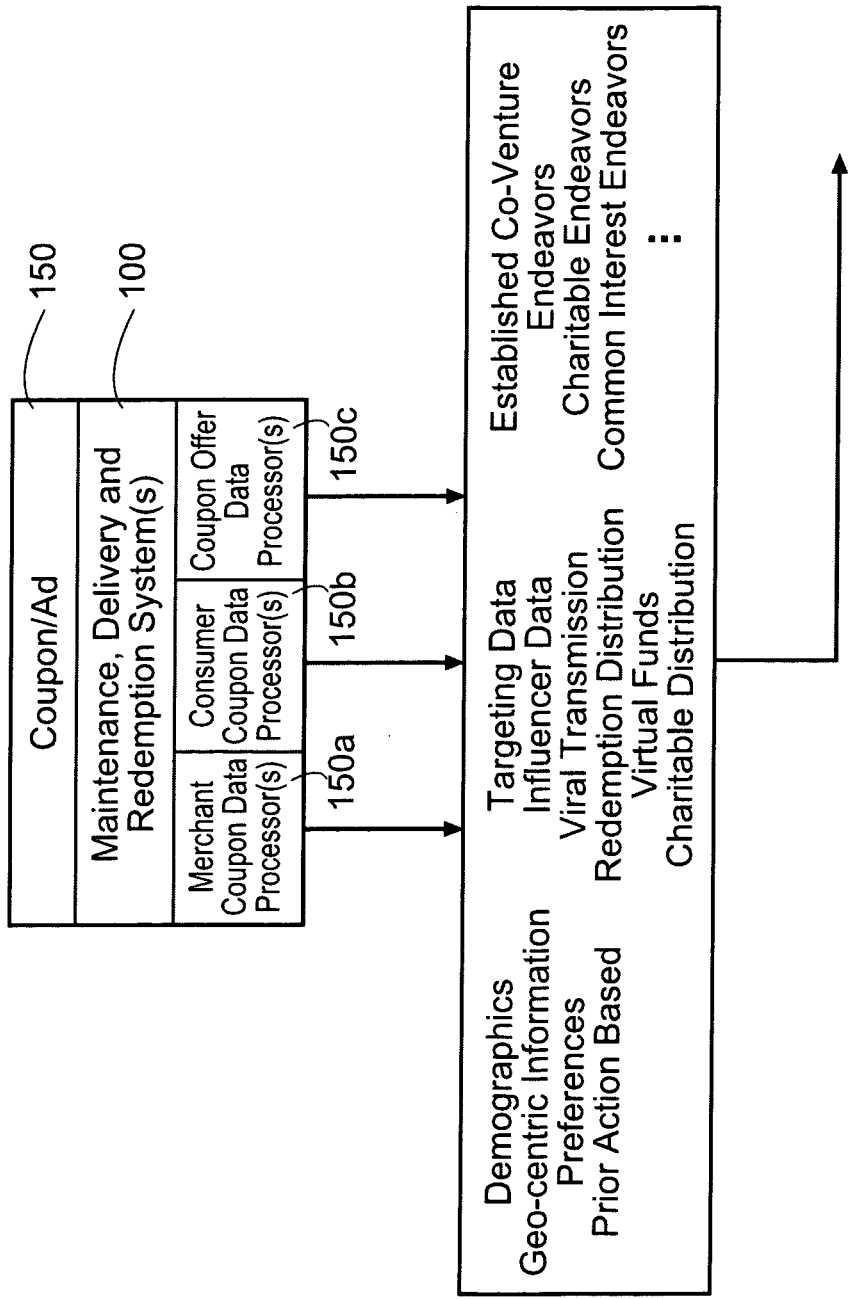
FIG. 11 is a block diagram of an exemplary system for performing illustrative ad selection, modification, scoring, response and adaptive operations consistent with the present invention.

Referring to FIG. 9 through FIG. 11, there is shown a high level diagrammatic representation of a coupon redemptive system 100 that may perform or assist in the performance of one or more of the operations described above. The system 100 may have associated processor(s) 150A, 150B, 150C which may also execute instructions, process information, facilitate the transfer of data and communication between related or unrelated processors and databases and can produce targeted coupons and ads directed to reward member's 1. The system 100 may include one or more processors (eg. 254, 300, etc.) which may operate on both received and stored data which may be located in one or more storage devices and/or servers (eg. 150, 180, 310, etc.) to generate information which may then be transmitted to the reward member 1. The instructions may include a set of decision rules which incorporate process states or sub sets of process states with rule preconditions generally in Boolean form (AND/OR). The processors may also contain instructions which provide a constraint and adaptive process which may define roles, participants, mathematical and logical relationships, activities, data values, data related to present and perceived activities, participant dependent and time-dependent variables and other options. The processors may be operated with one or more of the instructions and may have sets of options which may be open, closed, assigned, unassigned, updated, context sensitive, etc. The participants may be assigned different options which may be dynamically modified to permit them to both inspect and engage in the options.

The system may also include one or more consumer aggregators 1010 who have relationships with one or more banks 1012, 1014, 1016 etc or other entities within the financial transaction network. The consumer aggregators 1010 may deliver information and/or coupons to customers of the banks and may serve as a gateway to the customers to enroll them as reward members 1.

As may be appreciated by reference to FIG. 9 and FIG. 10, other entities may participate within the financial network and become a part of the system 100. For example, the card issuing entity 216 may have an affiliation with an affinity entity and co-issue a card 216A to its members. Thus, AARP® may co-issue a card 216A with a bank and provide it to its members. Those members may, through AARP® and the card issuing entity 216, become part of the system 100, and receive the benefits of coupons from an acquiring merchant 200a for, redemption through an acquiring processor 214 and acquiring bank 214a and engagement in a social network environment.

Figure 12:
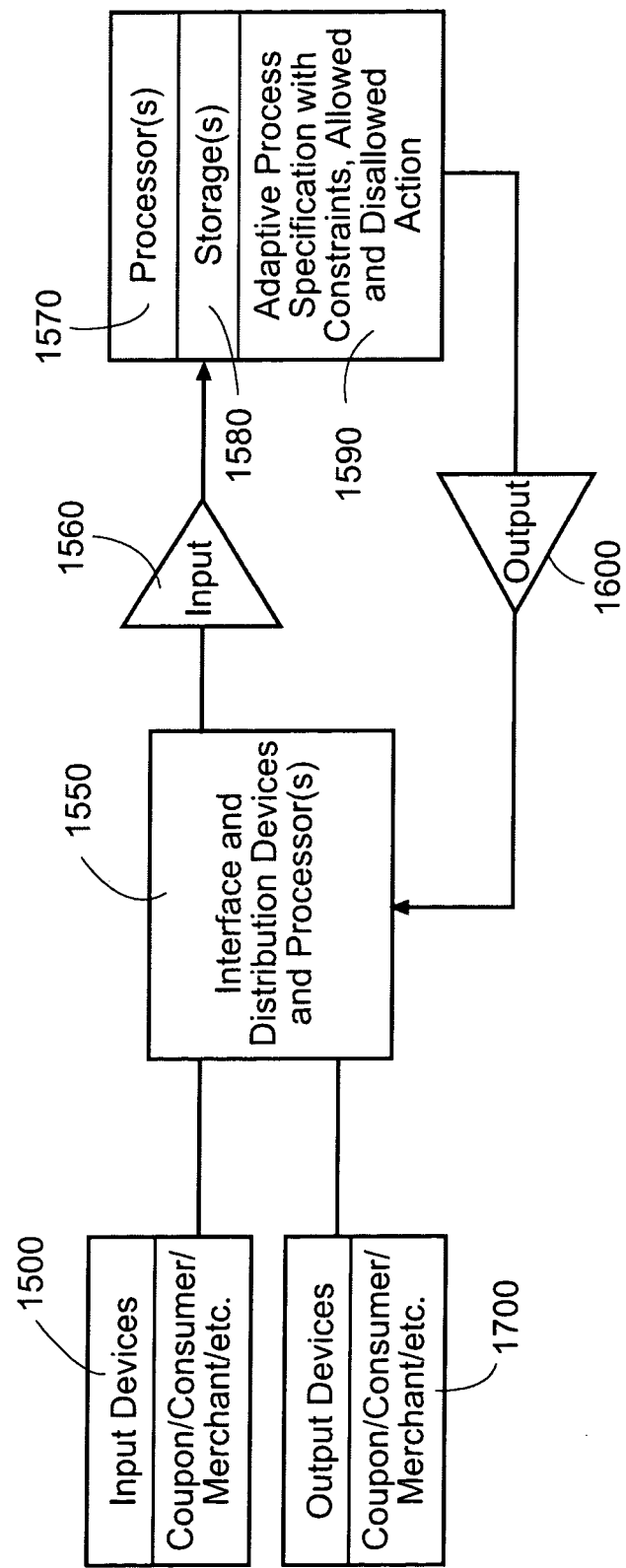
FIG. 12 is a block diagram of an exemplary system which may perform some of the activities and operations in an illustrative manner consistent with an aspect of the present invention.

FIG. 12 is a block diagram of system 100 that may perform one or more of the distributions and operations which are described in greater detail throughout this document and which form part of the present invention. The system 100 may obtain data from input devices 1500 which may be operatively connected to one or more interface and distribution devices and processors 1550. System buses (not shown) may be operatively disposed between the related portions of the system 100 to assist in the transmission of an input 1560 or an output 1600 communication between the various devices and elements of the system 100 that may be delivered to output devices 1700. Storage devices 1580, consisting of one or more storage elements may be incorporated into the system 100 and the data within the storage devices 1580 may be operated on by the processors 1570 either employing adaptive process specifications 1590 or as the result of external operations. Processors 1570 may execute machine executable instructions in any number of languages and operating on different operating systems such as Linux, by way of example only. The system 100 may be comprised of microprocessors embodied in personal computers or in distributed facilities or server farms.

Figure 13:
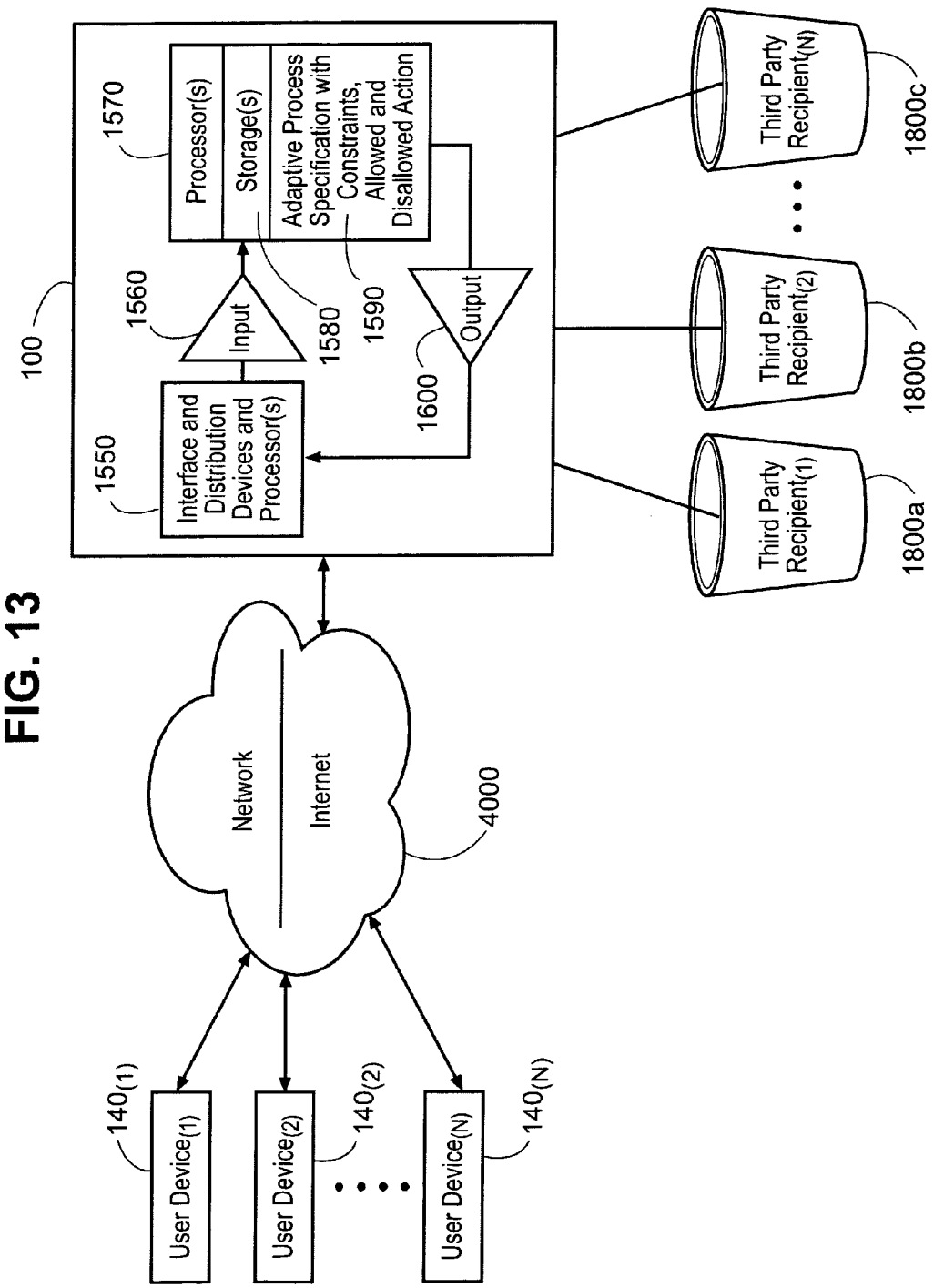
FIG. 13 is a block diagram of an exemplary system for performing illustrative response directives within a social network environment and adaptive operations consistent with the present invention.
Figure 15:
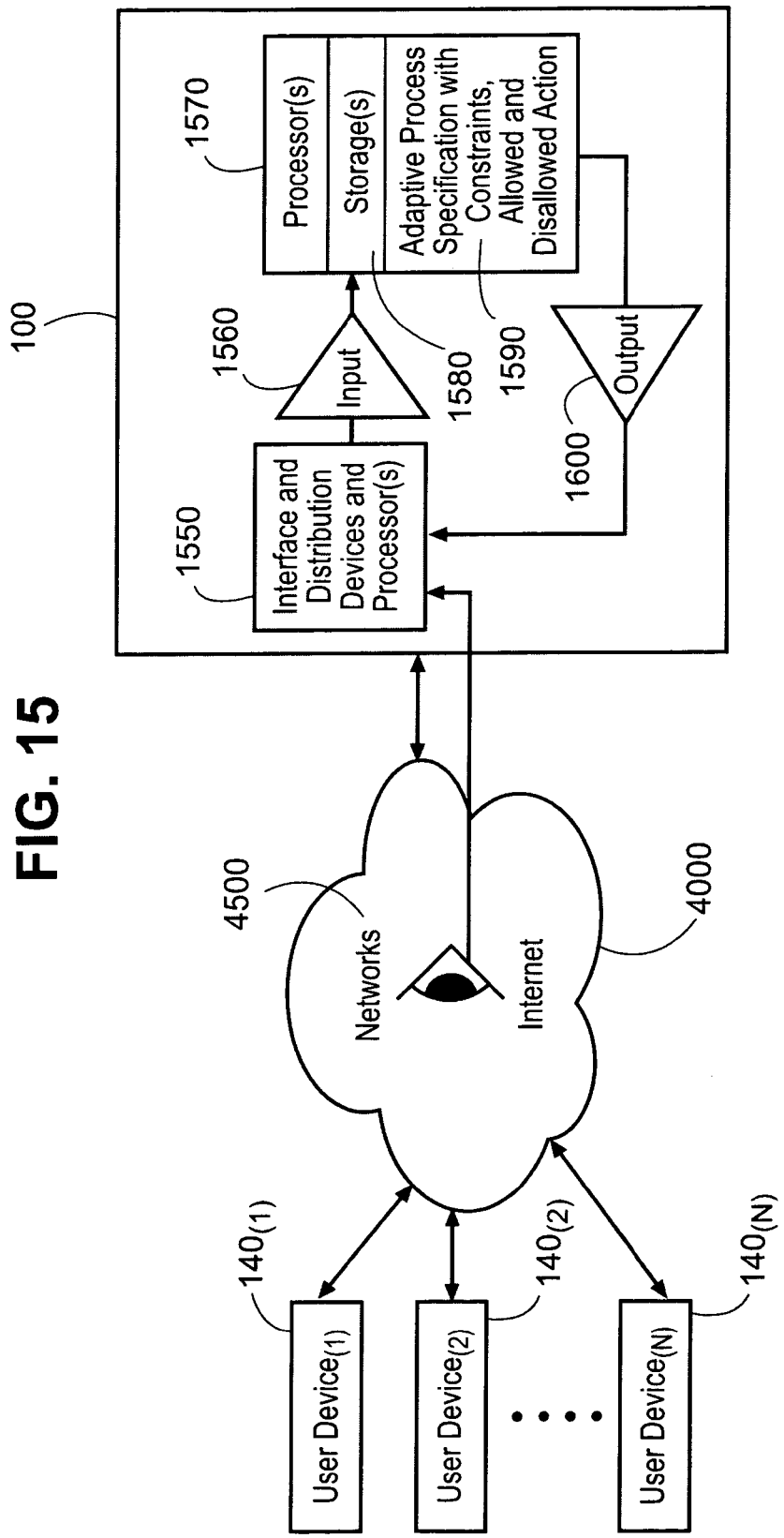
FIG. 15 is a block diagram of an exemplary system for obtaining illustrative response data within a social network environment and illustrative adaptive operations consistent with the present invention.

Referring to FIG. 13 though FIG. 15, there are shown illustratively a network which may be employed to interconnect variously user devices 140 (1) through 140(*n*) including mobile devices, servers and processors, and the incentive delivery system to one another. The network may also advantageously be designed and configured to interconnect third parties and other entities and resources including Internet, intranet, direct connections, local area networks, wide area networks, metropolitan area networks via wired and or wireless protocol and/or standard systems. In the examples depicted it can be appreciated that the user devices may be capable of storing one or more applications which may receive and/or forward coupons and ads, among other things to and from each other and to and from other data structures. The content may include instant messages, enhanced messages, SMS messages and other content both visual, text, graphics, voice messages and other data.

The system 100 may be utilized to provide a distributed application of the benefit of the reward. The reward member 1 may either individually or through a social networking site 4000 determine and log an action to have some or all of the benefit sent to another party including a charity. The reward member 1 may permit their actions of purchasing and receiving a benefit to be logged on the social networking website 4000/4500 and thereafter communicated to others who populate the site with a description of the action taken. The reward member 1 may form within the social network site a subgroup 4500 to participate and follow the reward member's actions. The social network site 4000 may alternatively be coupled to another site 4500 to permit the members of the social network site to see what actions are being taken by the reward member 1 and others on that other site. Thus when a reward member 1 is seen as purchasing something at the other site and obtaining the benefit of a coupon or discount the other members of the social networking website and third party recipients 1800*a*, 1800*b* through 1800*c* (See FIG. 13) will be advised of the action and, particularly if the reward member 1 is someone who is highly followed within the social networking website, the other members may also engage in similar purchasing and redemptive activity.

An alternative to the above and another aspect of the invention is where a member of a social networking website identifies his use of one or more credit, debit or other transaction cards so that the use of the transaction card is sent to the social website. The reward member 1 may elect to have the incentive processing entity send the use information to the social networking site or may opt to have the information sent by some other entity. The information transmitted to the social network site may contain information about the particular transaction, the merchant involved, the location of the merchant or entity, the amount of the reward and other information that the reward member 1 perceives will be of interest to other within the social network.

It is another aspect and embodiment of an aspect of the invention that the use of coupons and redemptions may be employed as a form of alternative currency. Thus, by way of example and referring to FIG. 15, it will be appreciated that both within and without the social network, the individuals who have redeemed a coupon will some credit. The individuals within a social network 4000 may trade those credits among one another or sell them on eBay or some other auction site or trade them in an exchange which facilitates the transfer of the credits. Although this may be more easily accomplished when the credits are retailer or brand specific, it is also feasible to do it when the credits are other than a simple cash payment or credit to the reward member 1. Thus, by way of example a $10 credit at Home Depot® may be worth (and exchanged for) an $8 credit at Lord & Taylor or a $6 credit at Abercrombie & Fitch.

Figure 14:
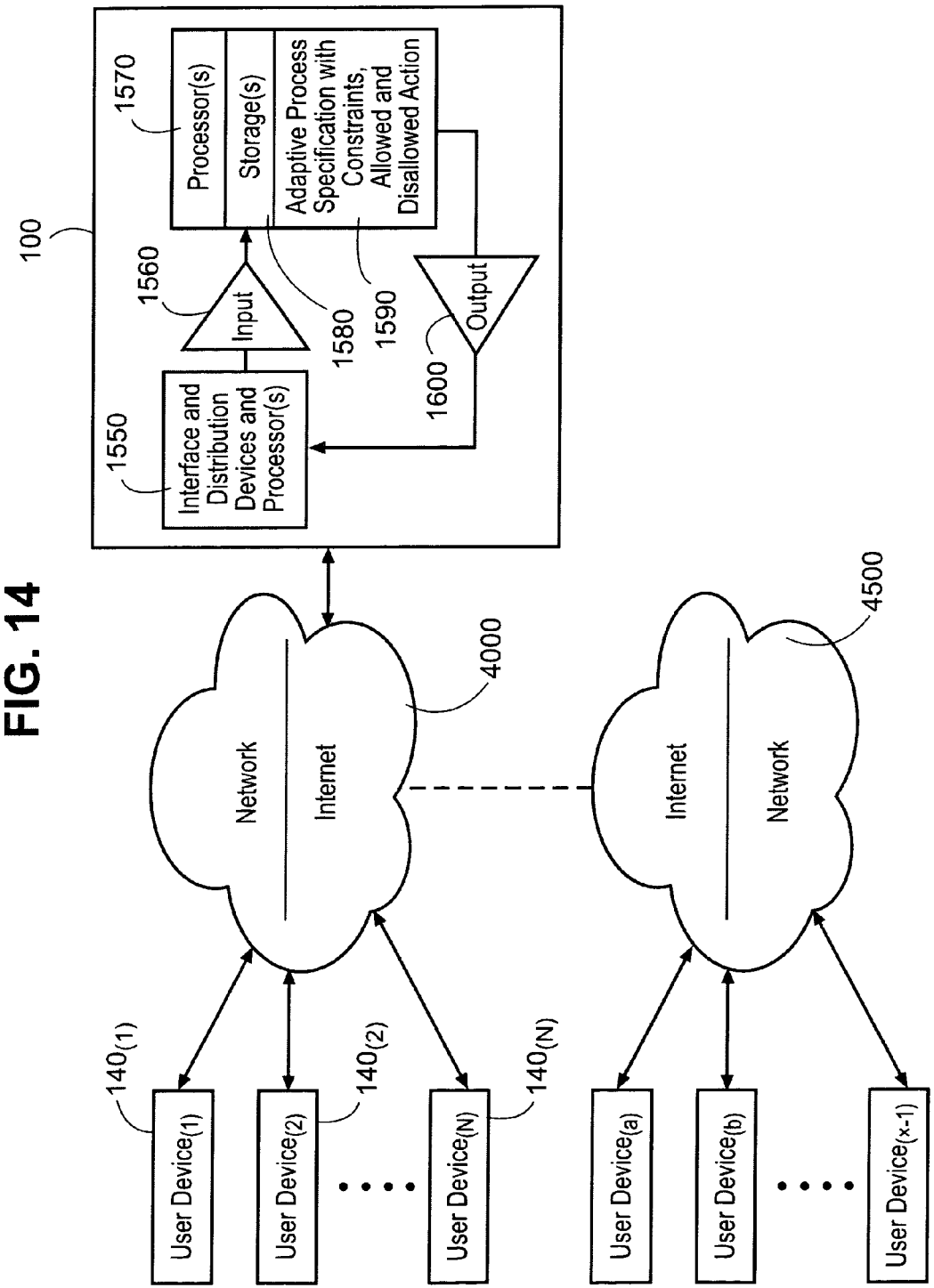
FIG. 14 is a block diagram of an exemplary system for transmitting and delivering to a mobile communication device within a social network environment illustrative redemption information in real time to the network environment and beyond and illustrative adaptive operations consistent with the present invention.

Referring to FIG. 14 and FIG. 15 and as a further aspect of the invention, the system 100 may permit users to share their respective location and activity by checking in through their credit card 210 and mobile device 140. Contrary to situations where a member of a social network 4000 must remember to check in to permit others to share their current experience and activities, the current invention may permit the system 100 to look into and be authorized by the reward member 1 to provide location and activity data automatically when they use their card. The information via an input 1560 to the processor 1570 and subsequent transmittal via an output 1600 can be relayed to others within the social network 4000 may be augment by permitting the reward member 1 to provide additional text or review of what they did. "lord and taylor was awesome-great selection" or "Great atmosphere at Bar XXXX and their happy hour is 50% off". The latter example would require a check in via mobile or letting the bar swipe the reward member's 1 card so that they could open a tab. All of this would permit advertisers and coupon sponsors to target precisely what the reward member 1 is doing and focus the incentive on them and would permit the advertisers and coupon sponsors to do the targeting on the fly.

It will be appreciated by those skilled in the art that the information which is obtained from the reward members, both individually and through their social networks, may be advantageously employed to generate criteria and specifications to refine the redemptive process and generate coupons and advertisements which are more targeted, both as to individuals and products. The use of such data is a part of this invention and its use is part of the adaptive process specification, constraints, allowed and disallowed actions which are part of the system. The data may, alternatively, be used by others both within and without the system for other commercial purposes generally related to inquiries which assist in determining how individuals behave and how they may be motivated to act or behave.

While various systems and methods have been described herein above, they've been set forth and presented by way of example only and are not in any way designed as a limitation. By way of example embodiments of the present disclosure can be performed by hardware and firmware, application modules and the like, and can be executable and/or resident on systems and devices shown herein and otherwise known in the art. The embodiments of the above disclosure are not in any way limited to a particular operating environment or instructions written in certain programmable language nor they limited to particular mobile devices or other related communications and processing units. The processing modules suitable for carrying out the embodiments of the present disclosure along with the software firmware and applications may be resident on one or more devices without varying from the spirit or scope of the present disclosure. Similarly separate module to be connected together or several modules may be used on an integrated basis without violating or otherwise being outside of the scope of the inventive disclosures set forth herein.

What is claimed is:

1. A computer implemented, opt-in incentive transaction system comprising:

a. a consumer designated incentive receiving device;

b. an incentive for a particular product and/or service delivered to the consumer prior to a transaction comprising at least a plurality of redemptive action requirements wherein one requirement is the transaction;
c. at least one processor for processing the incentive;
d. at least one storage device for storing and aggregating a plurality of incentives to the consumer for a number of particular products and/or services;
e. at least one storage device for storing processor-executable instructions;
f. means for controlling the at least one processor to execute the instructions and to deliver the incentive to the consumer incentive receiving device and associating it with a consumer's financial account prior to the transaction;
g. means for obtaining at least one consumer unique, financial identifier associated with the consumer's financial account at a point-of-sale device without presenting of the generated incentive at the point-of-sale device;
h. means for receiving data from a point-of-sale device reporting the transaction associated with the incentive;
i. means for transmitting the consumer unique identifier and the transaction redemption action via an authorization stream to an acquiring processor;
j. means for comparing by the acquiring processor the identifier, transaction, and transaction redemptive action with the redemptive action requirements and the incentive for the particular product and/or service at a location other than the point-of-sale device, determining whether the redemptive action requirements have been satisfied by the correct consumer; and
k. means for applying by the acquiring processor the incentive to the consumer's financial account in accordance with the consumer's pre-established, non-point-of-sale instructions at a location other than at the point-of-sale device.

2. The system of claim 1 further comprising an opt-in registration module.

3. The system of claim 2 wherein the opt-in registration module is a consumer aggregator.

4. The system of claim 1 further comprising communication means for transmitting at least one item of consumer transaction data to a second receiving device.

5. The system of claim 1 further comprising communication means for transmitting at least one item of consumer transaction data to at least one user of a social networking application.

6. The system of claim 5 further comprising selection means to permit the consumer to select the at least one user of the social networking application.

7. The system of claim 1 further comprising communication means for transmitting at least one item or consumer transaction data between users of a social networking application.

8. The system of claim 7 further comprising selection means to permit the consumer to select the users of the social networking application.

9. The system of claim 7 in which the data received by the system comprises statistical data related to contacts between the users of the social networking application.

10. The system of claim 1 further comprising at least one processor for determining what activity is undertaken by at least one user of a social networking application in response to receipt of at least one item of consumer transaction data and processing said activity for possible application to the processor-executable instructions.

11. The system of claim 1 wherein the transaction is a purchase.

12. The system of claim 1 further comprising means for transmitting confirmation to the consumer of the satisfaction of the redemptive action requirements.

13. The system of claim 12 wherein the financial system identifier is a magnetically readable strip.

14. The system of claim 12 wherein the financial system identifier is a credit card.

15. The system of claim 12 where in the financial system identifier is a debit card.

16. The system of claim 12 wherein the financial system identifier is a reward card.

17. The system of claim 1 wherein the incentive receiving device is a mobile device.

18. The system of claim 1 further comprising a processor configured to receive consumer requests for an incentive.

19. The system of claim 18 further comprising processor control means configured to transmit the incentive requested by the consumer.

20. The system of claim 18 further comprising processor control means configured to transmit an incentive determined by the system to be within predetermined rules relating to the requested incentive.

21. The system of claim 1 in which the processor-executable instructions include at least one predetermined rule relating to the transmission of incentives.

22. The system of claim 1 in which the processor-executable instructions include a series of predetermined rules relating to the transmission of incentives.

23. The system of claim 22 in which the predetermined rules are adaptable in relation to data received by the system.

24. The system of claim 23 in which the data received by the system comprises statistical data related to a consumer.

25. The system of claim 23 in which the data received by the system comprises statistical data related to consumers.

26. The system of claim 23 in which the data received by the system comprises statistical data related to redemptive action s undertaken by consumers.

27. The system of claim 23 in which the data received by the system comprises statistical data related to the frequency of actions undertaken by consumers.

28. The system of claim 22 in which the series of predetermined rules relating to the transmission of incentives includes at least one rule related to location of the consumer.

29. The system of claim 22 in which the series of predetermined rules relating to the transmission of incentives includes at least one rule related to the incentive redemption location.

30. The system of claim 22 in which the series of predetermined rules relating to the transmission of incentives includes at least one rule related to inventory.

31. The system of claim 22 in which the series of predetermined rules relating to the transmission of incentives includes at least one rule related to SKU information.

32. The system of claim 22 in which the series of predetermined rules relating to the transmission of incentives includes at least one rule related to UPC information.

33. The system of claim 22 in which the series of predetermined rules relating to the transmission of incentives may be modified.

34. The system of claim 22 in which the series of predetermined rules relating to the transmission of incentives may include a plurality of rules relating to the same parameter.

35. The system of claim 1 in which the delivery of the incentive is conditional upon a consumer opting in to the system.

36. A computer implemented, opt-in incentive transaction system comprising:
 a. a consumer designated incentive receiving device;
 b. an incentive for a particular product and/or service delivered to the consumer prior to a transaction and available to either a targeted or an open consumer base, the incentive comprising at least a plurality of redemptive action requirements wherein one requirement is obtaining the incentive prior to the transaction;
 c. at least one processor for processing the incentive;
 d. at least one storage device for storing and aggregating a plurality of incentives to the consumer for a number of particular products and/or services;
 e. at least one storage device for storing processor-executable instructions;
 f. means for controlling the at least one processor to execute the instructions and to deliver the incentive to the consumer incentive receiving device and associating it with a consumer's financial account prior to the transaction;
 g. means for generating an associated consumer-merchant identifier to the incentive;
 h. means for storing the consumer-merchant identifier associated with the incentive;
 i. means for obtaining at least one consumer unique, financial identifier associated with the consumer's financial account at a point-of-sale device without presenting of the generated incentive at the point of sale device;
 j. means for receiving data from a point-of-sale device reporting a consumer-merchant transaction;
 k. means for transmitting the consumer unique identifier and the transaction redemption action to an acquiring processor;
 l. means for comparing by said acquiring processor the consumer-merchant transaction identifier, financial identifier and transaction redemption action with the consumer-merchant transaction and the incentive for the particular product and/or service at a location other than the point-of-sale device; and,
 m. means to credit the incentive by the acquiring processor to the consumer-merchant transaction to the consumer's financial account at a location other than the point-of-sale device in accordance with the consumer's pre-established, non-point-of-sale instructions.

37. The system of claim 36 further comprising an opt-in registration module and wherein the opt-in is a purchase of a pre-paid redemptive amount at a cost to the consumer which is less than the redemptive amount.

38. The system of claim 37 wherein the offer is contained in audio/visual content delivered to the consumer.

39. The system of claim 36 further comprising mean to transmit confirmation to the consumer of the satisfaction of the at least one redemptive action requirement is transmitted in accordance with the consumer's instruction.

40. The system of claim 36 further comprising mean to transmit confirmation of the satisfaction of the at least one redemptive action requirement is transmitted in accordance with the consumer's instruction.

41. The system of claim 36 wherein the incentive is contained in audio/visual content delivered to the consumer.

42. A computer implemented, opt-in incentive transaction system comprising:
 a. a consumer designated incentive receiving device;
 b. a variable incentive for a particular product and/or service delivered to the consumer prior to a transaction and available to either a targeted or an open consumer base, the variable incentive comprising at least a plurality of redemptive action requirements wherein one requirement is obtaining the incentive;
 c. at least one processor for processing the variable incentive;
 d. at least one storage device for storing and aggregating a plurality of incentives to the consumer for a number of particular products and/or services;
 e. at least one storage device for storing processor-executable instructions;
 f. means for controlling the at least one processor to execute the instructions and to deliver the selected incentive to the consumer incentive receiving device and associating it with a consumer's financial account prior to the transaction;
 g. means for generating an associated consumer-merchant identifier to the selected incentive;
 h. means for storing the consumer-merchant identifier associated with the selected incentive;
 i. means for obtaining at least one consumer unique, financial identifier associated with the consumer's financial account at a point-of-sale device without presenting of the generated incentive at the point of sale device;
 j. means for receiving data from a point-of-sale device reporting a consumer-merchant transaction;
 k. means for transmitting the consumer unique identifier and the transaction redemption action to an acquiring processor;
 l. means for comparing by said acquiring processor the consumer-merchant transaction identifier, financial identifier and transaction redemption act ion with the consumer-merchant transaction and the incentive for the particular product and/or service at a location other than the point-of-sale device; and,
 m. means to credit the selected incentive by the acquiring processor to the consumer-merchant transaction to the consumer's financial account at a location other than the point-of-sale device in accordance with the consumer's preestablished, non-point-of-sale instructions.

43. The system of claim 42 wherein the incentive is an offer to purchase a pre-paid redemptive amount at a cost to the consumer which is less than the redemptive amount.

44. The system of claim 42 further comprising an opt-in registration module and wherein the opt-in is a purchase of a pre-paid redemptive amount at a cost to the consumer which is less than the redemptive amount.

45. The system of claim 42 further comprising means to reconcile the credit for the selected incentive and the consumer-merchant transaction.

46. The system of claim 42 further comprising means to reconcile the credit for the selected incentive and the consumer-merchant transaction and permit a charge in excess of the selected incentive where the consumer-merchant transaction is in an amount in excess of the redemptive amount of the selected incentive.

* * * * *